US012698597B2

(12) United States Patent
Weisang et al.

(10) Patent No.: US 12,698,597 B2
(45) Date of Patent: *Aug. 4, 2026

(54) CORELESS ROLLS OF A TISSUE PAPER PRODUCT AND METHODS OF MANUFACTURING CORELESS ROLLS

(71) Applicant: Essity Hygiene and Health Aktiebolag, Gothenburg (SE)

(72) Inventors: Nicolas Weisang, Kunheim (FR); Sébastien Jeannot, Kunheim (FR); Benoit Arnoul-Jarriault, Kunheim (FR)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/724,456

(22) PCT Filed: Dec. 29, 2021

(86) PCT No.: PCT/IB2021/000925
§ 371 (c)(1),
(2) Date: Jun. 26, 2024

(87) PCT Pub. No.: WO2023/126639
PCT Pub. Date: Jul. 6, 2023

(65) Prior Publication Data
US 2025/0116069 A1     Apr. 10, 2025

(51) Int. Cl.
*D21H 27/32*          (2006.01)
*A47K 10/16*          (2006.01)
(Continued)

(52) U.S. Cl.
CPC ............. *D21H 27/32* (2013.01); *A47K 10/16* (2013.01); *B31F 1/07* (2013.01); *B32B 29/005* (2013.01);
(Continued)

(58) Field of Classification Search
CPC ...... D21H 27/32; D21H 27/005; D21H 27/02; D21H 27/40; D21H 27/30; D21H 27/002;
(Continued)

(56) References Cited

U.S. PATENT DOCUMENTS

| | | | |
|---|---|---|---|
| 2,177,490 A | 10/1939 | Kieffer | |
| 3,337,388 A | 8/1967 | Wosaba | |

(Continued)

FOREIGN PATENT DOCUMENTS

| | | |
|---|---|---|
| CA | 2049552 A1 | 2/1992 |
| CA | 2096140 A1 | 10/1993 |

(Continued)

OTHER PUBLICATIONS

U.S. Appl. No. 18/545,976, filed Dec. 19, 2023; Non-Final Office Action mailed Jul. 2, 2024; 56 pages.

(Continued)

*Primary Examiner* — Jose A Fortuna

(74) *Attorney, Agent, or Firm* — CANTOR COLBURN LLP

(57) ABSTRACT

A coreless roll of a tissue paper product has a first end and a second end, and a web of tissue paper product being wound such as to define a central inner hole with the first end located on the outer side and the second end located at the inner hole, the product including a bonded first ply and a second ply, a grammage of the product being 35 to 55 g/m$^2$, and having a Geometric Mean Tensile strength of at least 200 N/m, the first ply and the second ply being made of Conventional Wet Press (CWP) paper and embossed to be nested, the coreless roll having an outer diameter of 95 to 150 mm, an inner hole diameter of 20 to 50 mm, and a density of the coreless roll of 70 to 90 kg/m$^3$, a caliper ratio of the roll of 40% to 70%.

13 Claims, 3 Drawing Sheets

(51) Int. Cl.

| | |
|---|---|
| *B31F 1/07* | (2006.01) |
| *B32B 29/00* | (2006.01) |
| *B32B 29/08* | (2006.01) |
| *B32B 37/12* | (2006.01) |
| *B32B 37/24* | (2006.01) |
| *B32B 38/06* | (2006.01) |
| *B32B 38/18* | (2006.01) |
| *D21H 27/00* | (2006.01) |
| *D21H 27/02* | (2006.01) |
| *D21H 27/40* | (2006.01) |

(52) U.S. Cl.

CPC .............. *B32B 29/08* (2013.01); *B32B 37/12* (2013.01); *B32B 37/24* (2013.01); *B32B 38/06* (2013.01); *B32B 38/18* (2013.01); *D21H 27/005* (2013.01); *D21H 27/02* (2013.01); *D21H 27/40* (2013.01); *B31F 2201/0723* (2013.01); *B31F 2201/0764* (2013.01); *B31F 2201/0787* (2013.01); *B32B 2037/243* (2013.01); *B32B 2250/26* (2013.01); *B32B 2255/12* (2013.01); *B32B 2307/54* (2013.01); *B32B 2307/7375* (2023.05); *B32B 2307/7376* (2023.05); *B32B 2317/12* (2013.01); *B32B 2555/00* (2013.01)

(58) Field of Classification Search

CPC . D21H 27/004; B31F 1/07; B31F 2201/0723; B31F 2201/0764; B31F 2201/0787; B31F 201/0774; B31F 2201/0789; B31F 2201/0725; B32B 29/005; B32B 29/08; B32B 37/12; B32B 37/24; B32B 38/06; B32B 38/18; B32B 2037/243; B32B 2250/26; B32B 2255/12; B32B 2307/54; B32B 2307/7375; B32B 2307/7376; B32B 2317/12; B32B 2555/00; A47K 10/16

See application file for complete search history.

(56) References Cited

U.S. PATENT DOCUMENTS

| | | | |
|---|---|---|---|
| 3,414,459 | A | 12/1968 | Wells |
| 3,556,907 | A | 1/1971 | Nystrand |
| 3,738,905 | A | 6/1973 | Thomas |
| 3,867,225 | A | 2/1975 | Nystrand |
| 3,953,638 | A | 4/1976 | Kemp |
| 3,998,690 | A | 12/1976 | Lyness et al. |
| 4,181,068 | A | 1/1980 | Pollock |
| 4,284,465 | A | 8/1981 | Walbrun |
| 4,320,162 | A | 3/1982 | Schulz |
| 4,339,088 | A | 7/1982 | Niedermeyer |
| 4,376,671 | A | 3/1983 | Schulz |
| 4,487,378 | A | 12/1984 | Kobayashi |
| 4,671,983 | A | 6/1987 | Burt |
| 5,468,323 | A | 11/1995 | Mcneil |
| 5,685,954 | A | 11/1997 | Marinack et al. |
| 5,779,860 | A | 7/1998 | Hollenberg |
| 5,900,114 | A | 5/1999 | Brown et al. |
| 5,922,439 | A | 7/1999 | Bredenick et al. |
| 6,077,390 | A | 6/2000 | Salman et al. |
| 6,080,276 | A | 6/2000 | Burgess |
| 6,102,313 | A | 8/2000 | Salzsauler et al. |
| 6,544,386 | B1 | 4/2003 | Krzysik et al. |
| 6,551,691 | B1 | 4/2003 | Hoeft et al. |
| 6,599,614 | B1 | 7/2003 | Roussel et al. |
| 6,610,173 | B1 | 8/2003 | Lindsay et al. |
| 6,746,558 | B2 | 6/2004 | Hoeft et al. |
| 6,805,766 | B1 | 10/2004 | Roussel et al. |
| 6,913,673 | B2 | 7/2005 | Baggot et al. |
| 7,026,037 | B2 | 4/2006 | Lefebvre et al. |
| 7,166,189 | B2 | 1/2007 | Burazin et al. |
| 7,291,379 | B2 | 11/2007 | Biagiotti |
| 7,785,696 | B2 | 8/2010 | Boatman et al. |
| 7,827,907 | B2 | 11/2010 | Koivukunnas et al. |
| 7,829,177 | B2 | 11/2010 | Russell et al. |
| 7,842,163 | B2 | 11/2010 | Nickel et al. |
| 7,967,951 | B2 | 6/2011 | Suzuki et al. |
| 7,971,526 | B2 | 7/2011 | Blenke et al. |
| 7,992,818 | B2 | 8/2011 | Maddaleni et al. |
| 8,158,047 | B2 | 4/2012 | Schulz et al. |
| 8,425,730 | B2 | 4/2013 | Biagiotti |
| 8,535,780 | B2 | 9/2013 | Wojcik et al. |
| 8,597,469 | B2 | 12/2013 | Biagiotti |
| 8,708,020 | B2 | 4/2014 | Schutz |
| 8,920,905 | B2 | 12/2014 | Sauter et al. |
| 8,974,892 | B2 | 3/2015 | Nencioni et al. |
| 9,034,478 | B2 | 5/2015 | Weisang et al. |
| 9,090,040 | B2 | 7/2015 | Sauter et al. |
| 9,284,147 | B2 | 3/2016 | Techlin |
| 9,365,376 | B2 | 6/2016 | Wojcik et al. |
| 9,375,116 | B2 | 6/2016 | Graff |
| 9,458,574 | B2 | 10/2016 | Myangiro et al. |
| 9,637,862 | B2 | 5/2017 | Saas et al. |
| 9,663,900 | B2 | 5/2017 | Jeannot et al. |
| 10,213,066 | B2 | 2/2019 | Weisang et al. |
| 10,280,567 | B2 | 5/2019 | Vogt et al. |
| 10,350,850 | B2 | 7/2019 | Roesch et al. |
| 10,463,204 | B2 | 11/2019 | Barredo |
| 10,654,239 | B2 | 5/2020 | Stefani |
| 10,696,004 | B2 | 6/2020 | Dettori et al. |
| 10,814,587 | B2 | 10/2020 | Kleinwaechter et al. |
| 11,090,900 | B2 | 8/2021 | Kraus et al. |
| 11,280,051 | B2 | 3/2022 | Satake Neto et al. |
| 11,346,058 | B2 | 5/2022 | Pleyber et al. |
| 11,491,699 | B2 | 11/2022 | Yoshimura |
| 11,987,030 | B2 * | 5/2024 | Dwiggins ................ B31F 1/07 |
| 12,018,439 | B2 | 6/2024 | Satake Neto et al. |
| 12,071,730 | B2 | 8/2024 | Pleyber et al. |
| 2002/0088596 | A1 | 7/2002 | Lamb |
| 2002/0197346 | A1 | 12/2002 | Papadopoulos |
| 2003/0026953 | A1 | 2/2003 | Müller |
| 2003/0111169 | A1 | 6/2003 | Baggot et al. |
| 2003/0118784 | A1 | 6/2003 | Hollmark |
| 2003/0129363 | A1 | 7/2003 | Hoeft et al. |
| 2004/0028935 | A1 | 2/2004 | Hauke |
| 2004/0166290 | A1 | 8/2004 | Sembritzki et al. |
| 2005/0069679 | A1 | 3/2005 | Stelljes et al. |
| 2005/0098281 | A1 | 5/2005 | Schulz et al. |
| 2005/0178513 | A1 * | 8/2005 | Russell .................. D21H 27/02 |
| | | | 162/123 |
| 2006/0065382 | A1 | 3/2006 | Burazin et al. |
| 2006/0070714 | A1 | 4/2006 | Perini |
| 2006/0130985 | A1 | 6/2006 | Beuther et al. |
| 2006/0222819 | A1 | 10/2006 | Gambini |
| 2006/0283538 | A1 | 12/2006 | Schulz et al. |
| 2007/0003736 | A1 | 1/2007 | Saarvali et al. |
| 2007/0062658 | A1 | 3/2007 | Wiwi et al. |
| 2007/0092700 | A1 | 4/2007 | Maddaleni et al. |
| 2007/0093157 | A1 | 4/2007 | Shannon |
| 2007/0137813 | A1 | 6/2007 | Nickel et al. |
| 2007/0184246 | A1 | 8/2007 | Nencioni et al. |
| 2007/0218248 | A1 | 9/2007 | Mansson et al. |
| 2008/0183708 | A1 | 7/2008 | Chen et al. |
| 2009/0162597 | A1 | 6/2009 | Barredo et al. |
| 2009/0226670 | A1 | 9/2009 | Schuetz |
| 2009/0255640 | A1 | 10/2009 | Morin et al. |
| 2009/0297781 | A1 | 12/2009 | Huss et al. |
| 2010/0021696 | A1 | 1/2010 | Hill et al. |
| 2010/0028621 | A1 | 2/2010 | Byrne et al. |
| 2010/0183350 | A1 | 7/2010 | Sauter et al. |
| 2010/0183850 | A1 | 7/2010 | Sauter et al. |
| 2010/0224338 | A1 | 9/2010 | Harper et al. |
| 2010/0229738 | A1 | 9/2010 | Hirota et al. |
| 2010/0239825 | A1 | 9/2010 | Sheehan et al. |
| 2010/0295214 | A1 | 11/2010 | Boatman et al. |
| 2011/0079671 | A1 | 4/2011 | Wojcik et al. |
| 2011/0123773 | A1 | 5/2011 | Lofink et al. |
| 2011/0311345 | A1 | 12/2011 | Mcneil |
| 2012/0152445 | A1 | 6/2012 | Barredo et al. |
| 2012/0156447 | A1 | 6/2012 | Hein et al. |

(56)  References Cited

U.S. PATENT DOCUMENTS

| | | | |
|---|---|---|---|
| 2012/0164426 A1 | 6/2012 | Barredo et al. | |
| 2012/0244241 A1 | 9/2012 | Mcneil | |
| 2012/0255671 A1 | 10/2012 | Wallstabe et al. | |
| 2013/0216789 A1 | 8/2013 | Kraus et al. | |
| 2013/0327876 A1 | 12/2013 | Wojcik et al. | |
| 2014/0224919 A1 | 8/2014 | Bixler et al. | |
| 2015/0184342 A1 | 7/2015 | Saas et al. | |
| 2015/0225903 A1 | 8/2015 | Jeannot et al. | |
| 2015/0298420 A1 | 10/2015 | Gungner et al. | |
| 2017/0274616 A1 | 9/2017 | Greenfield | |
| 2017/0280946 A1 | 10/2017 | Weisang et al. | |
| 2017/0328011 A1 | 11/2017 | Sealey et al. | |
| 2018/0014699 A1 | 1/2018 | Barredo | |
| 2018/0104928 A1 | 4/2018 | Dwiggins | |
| 2018/0142422 A1 | 5/2018 | Baum et al. | |
| 2018/0187377 A1 | 7/2018 | Ziegenbein | |
| 2018/0216398 A1 | 8/2018 | Veerasamy | |
| 2019/0061302 A1 | 2/2019 | Barnholtz et al. | |
| 2019/0063004 A1 | 2/2019 | Barnholtz | |
| 2019/0078263 A1 | 3/2019 | Glass et al. | |
| 2019/0136457 A1 | 5/2019 | Lindsay et al. | |
| 2019/0301099 A1 | 10/2019 | Montagnani et al. | |
| 2020/0011014 A1 | 1/2020 | Pleyber et al. | |
| 2020/0156891 A1 | 5/2020 | Kurosaki | |
| 2020/0263361 A1 | 8/2020 | Weisang | |
| 2020/0277737 A1 | 9/2020 | Weisang | |
| 2020/0298525 A1 | 9/2020 | Dwiggins | |
| 2020/0324506 A1 | 10/2020 | Picchi et al. | |
| 2020/0384718 A1 | 12/2020 | Picchi et al. | |
| 2021/0070005 A1 | 3/2021 | Kumar et al. | |
| 2021/0122561 A1 | 4/2021 | Lemke et al. | |
| 2021/0180260 A1 | 6/2021 | Satake Neto et al. | |
| 2021/0292972 A1 | 9/2021 | Lecount et al. | |
| 2021/0310197 A1 | 10/2021 | Lecount et al. | |
| 2021/0381172 A1 | 12/2021 | Goulet et al. | |
| 2022/0010498 A1 | 1/2022 | Pleyber et al. | |
| 2022/0112642 A1 | 4/2022 | Giurlani et al. | |
| 2022/0154409 A1 | 5/2022 | Curley et al. | |
| 2022/0168925 A1 | 6/2022 | Giurlani et al. | |
| 2022/0275584 A1 | 9/2022 | Satake Neto et al. | |
| 2023/0146893 A1 | 5/2023 | Pieroni et al. | |
| 2023/0249431 A1 | 8/2023 | Barredo et al. | |
| 2023/0250591 A1* | 8/2023 | Jeannot | D21H 27/005 |
| | | | 428/154 |
| 2023/0265617 A1 | 8/2023 | Weisang et al. | |
| 2023/0287630 A1 | 9/2023 | Weisang et al. | |
| 2023/0295878 A1* | 9/2023 | Arnoul-Jarriault | D21H 27/38 |
| | | | 162/116 |
| 2023/0295880 A1* | 9/2023 | Jeannot | D21H 27/004 |
| | | | 162/116 |
| 2023/0366157 A1 | 11/2023 | Jeannot | |
| 2024/0117566 A1 | 4/2024 | Skarius et al. | |
| 2024/0117568 A1* | 4/2024 | Weisang | D21H 27/32 |
| 2024/0209575 A1 | 6/2024 | Bailey et al. | |
| 2024/0229362 A1 | 7/2024 | Kientz et al. | |
| 2025/0092609 A1 | 3/2025 | Jeannot | |
| 2025/0116069 A1* | 4/2025 | Weisang | A47K 10/16 |
| 2025/0250743 A1* | 8/2025 | Weisang | D21H 27/02 |
| 2025/0250744 A1* | 8/2025 | Weisang | B32B 38/18 |

FOREIGN PATENT DOCUMENTS

| | | | | |
|---|---|---|---|---|
| CA | 2776477 C | 11/2018 | | |
| CL | 200501067 | 4/2006 | | |
| CL | 200803570 | 12/2009 | | |
| CL | 2014000030 A1 | 7/2014 | | |
| CL | 202101610 | 6/2021 | | |
| CL | 202203775 | 12/2022 | | |
| CL | 202300009 | 1/2023 | | |
| CL | 202300010 | 1/2023 | | |
| CN | 1326523 A | 12/2001 | | |
| CN | 102143837 A | 8/2011 | | |
| CN | 102574354 A | 7/2012 | | |
| CN | 104136683 A | 11/2014 | | |
| CN | 104302471 A | 1/2015 | | |
| CN | 104520506 A | 4/2015 | | |
| CN | 107250013 A | 10/2017 | | |
| CN | 108431316 A | 8/2018 | | |
| CN | 207954831 U | 10/2018 | | |
| CN | 109310794 A | 2/2019 | | |
| CN | 110268116 A | 9/2019 | | |
| CN | 110914037 A | 3/2020 | | |
| CN | 210362711 U | 4/2020 | | |
| CN | 111148876 A | 5/2020 | | |
| CN | 111727288 A | 9/2020 | | |
| CN | 112218985 A | 1/2021 | | |
| CN | 115735031 B | * 7/2024 | D21H 27/004 | |
| CN | 118541524 A | 8/2024 | | |
| CO | 5031318 A1 | 4/2001 | | |
| CO | 5031322 A1 | 4/2001 | | |
| CO | 5200825 A1 | 9/2002 | | |
| CO | 5650179 A2 | 6/2006 | | |
| CO | 2017008071 A2 | 10/2017 | | |
| CO | 2018010262 A2 | 12/2018 | | |
| DE | 10137116 A1 | 2/2003 | | |
| DE | 20313418 U1 | 10/2003 | | |
| DE | 102005055707 A1 | 5/2007 | | |
| EP | 0264676 A1 | 4/1988 | | |
| EP | 338792 A2 | 10/1989 | | |
| EP | 426288 A2 | 5/1991 | | |
| EP | 499942 A2 | 8/1992 | | |
| EP | 668152 A1 | 8/1995 | | |
| EP | 739708 A2 | 10/1996 | | |
| EP | 0701641 B1 | 9/1997 | | |
| EP | 0668152 B1 | 12/1998 | | |
| EP | 934738 A1 | 8/1999 | | |
| EP | 1081284 A1 | 3/2001 | | |
| EP | 1208965 A2 | 5/2002 | | |
| EP | 0813382 B1 | 6/2002 | | |
| EP | 1321570 A2 | 6/2003 | | |
| EP | 1321576 A2 | 6/2003 | | |
| EP | 1338412 A1 | 8/2003 | | |
| EP | 1400199 A | 3/2004 | | |
| EP | 1464263 A1 | 10/2004 | | |
| EP | 1907199 A1 | 4/2008 | | |
| EP | 1996395 A1 | 12/2008 | | |
| EP | 2044264 A1 | 4/2009 | | |
| EP | 2095935 A1 | 9/2009 | | |
| EP | 2261420 A1 | 12/2010 | | |
| EP | 2292840 A1 | 3/2011 | | |
| EP | 2353859 B1 | 8/2011 | | |
| EP | 2360015 A1 | 8/2011 | | |
| EP | 2664451 A1 | 11/2013 | | |
| EP | 2692948 A1 | 2/2014 | | |
| EP | 2754553 A2 | 7/2014 | | |
| EP | 2884001 A1 | 6/2015 | | |
| EP | 2998436 A1 | 3/2016 | | |
| EP | 3143203 A1 | 3/2017 | | |
| EP | 3436087 A1 | 2/2019 | | |
| EP | 2925202 B1 | * 7/2019 | A47K 10/16 | |
| EP | 4166314 A2 | 4/2023 | | |
| EP | 4176125 B1 | 9/2024 | | |
| EP | 4077808 B1 | 1/2025 | | |
| EP | 4176124 B1 | 1/2025 | | |
| ES | 2295354 T3 | 4/2008 | | |
| ES | 2339668 T3 | 5/2010 | | |
| ES | 2578830 A2 | 8/2016 | | |
| ES | 2990036 T3 | 11/2024 | | |
| GB | 1259521 A | 1/1972 | | |
| GB | 2255745 A | 11/1992 | | |
| IT | MI951197 A1 | 12/1996 | | |
| IT | 201800006097 A1 | 12/2019 | | |
| JP | 2006045690 A | 2/2007 | | |
| JP | 2007136861 A | 6/2007 | | |
| JP | 2008094067 A | 4/2008 | | |
| JP | 2008138310 A | 6/2008 | | |
| JP | 4649118 B2 | 3/2011 | | |
| JP | 2012110407 A | 6/2012 | | |
| JP | 2015074098 A | 4/2015 | | |
| JP | 2019188021 A | 10/2019 | | |
| JP | 2020072992 A | 5/2020 | | |
| MX | 2014012792 A | 3/2015 | | |
| WO | 9406623 A1 | 3/1994 | | |

(56) References Cited

FOREIGN PATENT DOCUMENTS

| | | | |
|---|---|---|---|
| WO | 9711228 | A1 | 3/1997 |
| WO | 9720107 | A1 | 6/1997 |
| WO | 9733043 | A1 | 9/1997 |
| WO | 9743483 | A1 | 11/1997 |
| WO | 9743484 | A1 | 11/1997 |
| WO | 9821410 | A1 | 5/1998 |
| WO | 9847706 | A1 | 10/1998 |
| WO | 9915332 | A1 | 4/1999 |
| WO | 9923290 | A1 | 5/1999 |
| WO | 9923299 | A1 | 5/1999 |
| WO | 9936253 | A1 | 7/1999 |
| WO | 9945205 | A1 | 9/1999 |
| WO | 9953140 | A1 | 10/1999 |
| WO | 9959511 | A2 | 11/1999 |
| WO | 0061358 | A1 | 10/2000 |
| WO | 0125537 | A1 | 4/2001 |
| WO | 0147699 | A1 | 7/2001 |
| WO | 0148314 | A2 | 7/2001 |
| WO | 0202869 | A2 | 1/2002 |
| WO | 02072340 | A2 | 9/2002 |
| WO | 02103112 | A1 | 12/2002 |
| WO | 03043806 | A2 | 5/2003 |
| WO | 03045681 | A1 | 6/2003 |
| WO | 03059139 | A1 | 7/2003 |
| WO | 03072344 | A1 | 9/2003 |
| WO | 2004042142 | A1 | 5/2004 |
| WO | 2004094726 | A1 | 11/2004 |
| WO | 2005064044 | A1 | 7/2005 |
| WO | 2005080677 | A2 | 9/2005 |
| WO | 2005095100 | A1 | 10/2005 |
| WO | 2006133389 | A2 | 12/2006 |
| WO | 2007030592 | A2 | 3/2007 |
| WO | 2007046124 | A1 | 4/2007 |
| WO | 2007070129 | A1 | 6/2007 |
| WO | 2007071734 | | 6/2007 |
| WO | 2007078363 | A1 | 7/2007 |
| WO | 2007103433 | A2 | 9/2007 |
| WO | 2008048151 | A1 | 4/2008 |
| WO | 2008069147 | A1 | 6/2008 |
| WO | 2010009769 | A1 | 1/2010 |
| WO | 2010023616 | A2 | 3/2010 |
| WO | 2010086837 | A2 | 8/2010 |
| WO | 2010135074 | A1 | 11/2010 |
| WO | 2010139759 | A1 | 12/2010 |
| WO | 2011078755 | A1 | 6/2011 |
| WO | 2013126531 | A1 | 8/2013 |
| WO | 2013179109 | A2 | 12/2013 |
| WO | 2014020424 | A1 | 2/2014 |
| WO | 2015175281 | A1 | 11/2015 |
| WO | 20150186052 | A1 | 12/2015 |
| WO | 2016081429 | A1 | 5/2016 |
| WO | 2016132168 | A1 | 8/2016 |
| WO | 2016159966 | A1 | 10/2016 |
| WO | 2017019421 | A1 | 2/2017 |
| WO | 2017037273 | A1 | 3/2017 |
| WO | 2017134846 | A1 | 8/2017 |
| WO | 2017168195 | A1 | 10/2017 |
| WO | 2017196516 | A1 | 11/2017 |
| WO | 2017197405 | A1 | 11/2017 |
| WO | 2017209738 | A1 | 12/2017 |
| WO | 201873985 | A1 | 4/2018 |
| WO | 2018166572 | A1 | 9/2018 |
| WO | 2018217599 | A1 | 11/2018 |
| WO | 2018217602 | A1 | 11/2018 |
| WO | 2018229676 | A1 | 12/2018 |
| WO | 201904225 | A1 | 1/2019 |
| WO | 201959180 | A1 | 3/2019 |
| WO | 2019064044 | A1 | 4/2019 |
| WO | 2019064045 | A1 | 4/2019 |
| WO | 2019064046 | A1 | 4/2019 |
| WO | 2019203699 | A1 | 10/2019 |
| WO | 2019219168 | A1 | 11/2019 |
| WO | 2020068839 | A1 | 4/2020 |
| WO | 2020128551 | A1 | 6/2020 |
| WO | 2021126026 | A1 | 6/2021 |
| WO | 2022003380 | A1 | 1/2022 |
| WO | 2022003381 | A1 | 1/2022 |
| WO | 2022003382 | A1 | 1/2022 |
| WO | 2022003383 | A1 | 1/2022 |
| WO | 2022003384 | A1 | 1/2022 |
| WO | 2022003385 | A1 | 1/2022 |
| WO | WO-2022003423 | A1 * | 1/2022 ............ A47K 10/16 |
| WO | 2024226558 | A1 | 10/2024 |

OTHER PUBLICATIONS

Chilean Application No. 202203775; Office Action with English dated Sep. 5, 2024; 35 pages.
U.S. Appl. No. 18/012,966; Non-Final Office Action dated Aug. 29, 2024; 68 pages.
U.S. Appl. No. 18/013,667; Restriction Requirement dated Sep. 17, 2024; 8 pages.
Chilean Application No. 202203662; CL Office Action with English translation dated Aug. 16, 2024; 18 pages.
Chinese Application No. 202080102548.0; Office Action with English translation dated Sep. 12, 2024; 28 pages.
U.S. Appl. No. 18/012,956; Non-Final Office Action dated Sep. 28, 2024; 22 pages.
Chinese Application No. 202080102451X; Decision of Rejection dated Jan. 15, 2025; 31 pages.
Colombian Application No. NC2022/0018141; Office Action with English translation dated Feb. 25, 2025; 20 pages.
U.S. Appl. No. 18/545,976; Final Office Action dated Mar. 18, 2025; 15 pages.
Chilean Application No. 202300008; Office Action with English translation dated Nov. 20, 2024; 25 pages.
Chilean Application No. 202300009; Office Action with English translation dated Nov. 12, 2024; 34 pages.
Chilean Application No. 202300010; Office Action with English translation dated Nov. 14, 2024; 31 pages.
Chinese Application No. 202080102451X; Office Action with English translation dated Jan. 15, 2025; 31 pages.
Chinese Application No. 2020801025480; Office Action with English translation dated Jan. 3, 2025; 21 pages.
Colombian Application No. NC2022/0017942; Office Action with English translation dated Oct. 30, 2024; 29 pages.
Colombian Application No. NC2022/0018141; Office Action with English translation dated Oct. 30, 2024; 15 pages.
Colombian Application No. NC2023/0001168; Office Action with English translation dated Sep. 12, 2024; 24 pages.
Colombian Patent Application No. NC2023/0001172; Office Action with English translation dated Aug. 27, 2024; 16 pages.
Ukraine Application No. 22546/3A/24; Office Action with English translation dated Nov. 13, 2024; 13 pages.
U.S. Appl. No. 18/012,956; Final Office Action dated Feb. 14, 2025; 30 pages.
Chinese Application No. 202080102451.X; Office Action with English dated Jul. 11, 2024; 31 pages.
Chinese Application No. 202080102647.9; Office Action with English dated Jul. 23, 2024; 26 pages.
Colombian Application No. NC2022/0017942; Office Action with English dated May 20, 2024; 32 pages.
Colombian Application No. NC2023/0001171; Office Action with English dated Jul. 24, 2024; 52 pages.
European Application No. 20753412.4; Communication pursuant to Article 94(3) EPC dated Jun. 12, 2024; 6 pgs.
U.S. Appl. No. 18/013,667; Non-Final Office Action dated Dec. 17, 2024; 112 pages.
U.S. Appl. No. 18/013,703; Restriction Requirement dated Dec. 18, 2024; 53 pages.
U.S. Appl. No. 18/545,976; Final Office Action dated Dec. 4, 2024; 37 pages.
Chilean Application No. 202203662; CL Office Action with English translation dated Mar. 21, 2024; 20 pages.
Chilean Application No. 202203663; CL Office Action with English translation dated Jan. 8, 2024; 19 pages.
Chinese Application No. 202080102390.7; Chinese Office Action with English translation dated Aug. 1, 2023; 18 pages.

(56) References Cited

OTHER PUBLICATIONS

Chinese Application No. 202080102393.0; Office Action with English translation dated Sep. 20, 2023; 11 pages.
Chinese Application No. 202080102449.2; Chinese Office Action with English translation dated Feb. 3, 2024; 38 pages.
Chinese Application No. 202080102449.2; Chinese Office Action with English translation dated Sep. 7, 2023; 20 pages.
Chinese Application No. 202080102451.X; First Office Action dated Dec. 23, 2023; 29 pages.
Chinese Application No. 202080102548.0; First Office Action dated Apr. 3, 2024; 25 pages.
Chinese Application No. 202180047021.7; Chinese Office Action with English translation dated Sep. 22, 2023; 28 pages.
CN Office Action with English Translation; CN Application No. 202180047021.7; Date Mailed: Feb. 24, 2024; pp. 1-7.
International Preliminary Report on Patentability for International Application No. PCT/IB2020/000586; International Filing Date: Jul. 3, 2020; Date of Mailing: Sep. 29, 2022; 25 pages.
International Search Report & Written Opinion for International Application No. PCT/IB2020/000583; International Filing Date: Jul. 3, 2020; Date of Mailing: Feb. 24, 2021; 13 pages.
International Search Report & Written Opinion for International Application No. PCT/IB2020/000586; International Filing Date: Jul. 3, 2020; Date of Mailing: Mar. 9, 2021; 12 pages.
International Search Report & Written Opinion for International Application No. PCT/IB2020/000588; International Filing Date: Jul. 3, 2020; Date of Mailing: Feb. 22, 2021; 11 pages.
International Search Report & Written Opinion for International Application No. PCT/IB2020/000589; International Filing Date: Jul. 3, 2020; Date of Mailing: Feb. 24, 2021; 11 pages.
International Search Report & Written Opinion for International Application No. PCT/IB2020/000592; International Filing Date: Jul. 3, 2020; Date of Mailing: Feb. 26, 2021; 15 pages.
International Search Report & Written Opinion for International Application No. PCT/IB2020/000595; International Filing Date: Jul. 3, 2020; Date of Mailing: Apr. 7, 2021; 17 pages.
International Search Report & Written Opinion for International Application No. PCT/IB2021/000458; International Filing Date: Jul. 2, 2021; Date of Mailing: Nov. 2, 2021; 19 pages.
International Search Report and Written Opinion for International Application No. PCT/IB/2021/000925; International Filing Date: Dec. 29, 2021; Date of Mailing: Jul. 22, 2022; 11 pages.
Mexican Application No. MX/E/2023/050579; Third Party Observation dated Jul. 17, 2023; 100 pages.
Mexican Application No. MX/E/2023/050580; Third Party Observation dated Jul. 17, 2023; 50 pages.
U.S. Appl. No. 18/012,956, filed Dec. 26, 2022; Non-Final Office Action mailed Jun. 23, 2023; 186 pages.
U.S. Appl. No. 18/012,956, filed Dec. 26, 2022; Notice of Allowance dated Sep. 20, 2023; 8 pages.
U.S. Appl. No. 18/012,956, filed Dec. 26, 2022; Notice of Allowance mailed Mar. 18, 2024; 97pages.
Written Opinion of the International Preliminary Examining Authority for International Application No. PCT/IB2020/000586; International Filing Date: Jul. 3, 2020; Date of Mailing: May 19, 2022; 8 pages.
U.S. Appl. No. 18/013,817; Non-Final Office Action dated Jan. 13, 2025; 107 pages.
Colombian Office Action NC2023/0001170; Office Action with English translation dated Aug. 20, 2024; 19 pages.
Colombian Patent Office, Office Action issued in CO NC2019/0010000 dated Aug. 9, 2021 with partial English Translation (15 apges).

International Searching Authority, Search Report and Written Opinion issued in International Application No. PCT/EP2017/055795 mailed Nov. 9, 2017 (14 pages).
National Intellectual Property Administration (CNIPA) of the People's Republic of China, Office Action issued in App. No. 201780086232.5 dated Nov. 19, 2021 with English Translation (17 pages).
U.S. Appl. No. 16/491,006; Notice of Allowance dated Feb. 4, 2022; 34 pages.
U.S. Appl. No. 18/012,955; Non-Final Office Action dated Nov. 5, 2024; 204 pages.
U.S. Appl. No. 18/013,735; Non-Final Office Action dated Nov. 4, 2024; 88 pages.
Chemical Technology of Pulp and Papermaking, 3rd edition, vol. 2, edited by J.P. Kathy (US), Light Industry Press, Mar. 1988, p. 365-366; With English Translation; 33 pages.
Chinese Application No. 202080102451.X; Office Action with English translation dated Jul. 21, 2025; 39 pages.
U.S. Appl. No. 18/013,817; Non-Final Office Action dated Aug. 11, 2025; 16 pages.
U.S. Appl. No. 18/012,956, filed Dec. 26, 2022; Notice of Allowance dated Jul. 8, 2025; 14 pages.
U.S. Appl. No. 18/545,976, filed Dec. 19, 2023; Notice of Allowance mailed Jul. 8, 2025; 13 pages.
Ukraine Application No. a 2022 04975; Office Action with English translation dated Jun. 23, 2025; 13 pages.
Chilean Application No. 202300011; Office Action dated Apr. 7, 2025; 36 pages.
Chinese Application No. 202080102647.9; Office Action dated May 1, 2025; 26 pages.
Singapore Application No. 11202261586X; Written Opinion dated Apr. 29, 2025; 5 pages.
U.S. Appl. No. 18/545,976, filed Dec. 19, 2023; Notice of Allowance mailed Jun. 6, 2025; 14 pages.
U.S. Appl. No. 18/013,703; Non-Final Office Action dated Jun. 9, 2025; 130 pages.
U.S. Appl. No. 18/013,817; Final Office Action dated May 5, 2025; 18 pages.
U.S. Appl. No. 18/012,956; Final Office Action dated Apr. 22, 2025; 27 pages.
U.S. Appl. No. 18/012,966; Final Office Action dated Apr. 16, 2025; 22 pages.
Singapore Application No. 11202261481U; Office Action dated Apr. 29, 2025; 5 pages.
U.S. Appl. No. 18/012,966; Non-Final Office Action dated Sep. 10, 2025; 38 pages.
Papermaking II, Drying, by (Finland) Komanku et al., China Light Industry Press, Jul. 2018, pp. 128-130; 22 pages.
Colombian Patent Application No. NC2022/0017941; Office Action with English translation dated Sep. 22, 2025; 10 pages.
Columbian Office Action, Application No. PCT/IB2020/000588, mailed Sep. 30, 2025; with English Translation 30 pages.
Columbian Office Action, Application No. NC2023/0001172, mailed Oct. 1, 2025, with English Translation, 23 pages.
Mexican Office Action, Application No. MX/a/2024/008090, mailed Janury 8, 2026, with English Translation, 34 pages.
National Intellectual Property Administration (Cnipa) of the People's Republic of China, Application No. 202180105263.7 mailed Jan. 15, 2026, with English Translation, 13 pages.
US Final Office Action, U.S. Appl. No. 18/013,817, mailed Mar. 12, 2026, 30 pages.

* cited by examiner

CORELESS ROLLS OF A TISSUE PAPER PRODUCT AND METHODS OF MANUFACTURING CORELESS ROLLS

CROSS REFERENCE TO RELATED APPLICATIONS

This application is a National Stage application of PCT/IB2021/000925, filed Dec. 29, 2021, which is incorporated by reference in its entirety herein.

TECHNICAL FIELD

The present disclosure relates to coreless rolls of a tissue paper product, such as household towel, made of a spirally wound continuous web of tissue paper product. The disclosure also relates to tissue paper products. Moreover, the disclosure relates to methods of manufacturing coreless rolls of a tissue paper product, such as household towel, as well as to methods of manufacturing tissue paper products.

TECHNICAL BACKGROUND

In the following, a "tissue paper product" relates to an absorbent paper based on cellulose wadding. The latter is also referred to as a tissue paper base-sheet in this field of technology.

Fibres contained in a tissue paper product are mainly cellulosic fibres, such as pulp fibres from chemical pulp (e.g. Kraft or sulphite), mechanical pulp (e.g. ground wood), thermo-mechanical pulp, chemo-mechanical pulp and/or chemo-thermo-mechanical pulp (CTMP). Pulps derived from both deciduous (hardwood) and coniferous (softwood) can be used. Fibres may also come from non-wood plants, e.g., cereal, bamboo, jute, and sisal. The fibres or a portion of the fibres may be recycled fibres, which may belong to any or all of the above categories. The fibres can be treated with additives, e.g. fillers, softeners, such as, but not limited to, quaternary ammonium compounds and binders, conventional dry-strength agents, temporary wet strength agents or wet-strength agents, in order to facilitate the original paper making or to adjust the properties thereof. The tissue paper product may also contain other types of fibres, e.g., regenerated cellulosic fibres or synthetic fibres for enhancing, for instance, strength, absorption, smoothness or softness of the tissue paper product.

Whenever reference is made to the "softness" of a tissue paper product in this text, reference is made to the property of softness as determined through an evaluation by panel members. A panel of ten members was used in this case. Panel lists are used to rank products in terms of softness. Softness Panel values are used as comparative values enabling a comparison between tested samples. The softer the product/tissue paper product is, the higher the rated value. The softness scale was in the present case set from 0 to 2.5 (2.5 being the highest value). Each sample is composed of one product, i.e., a tissue paper product. Alternatively, each sample is a ply. Samples are first conditioned for a minimum of two hours in a controlled area at 23° C. and 50% relative humidity. Then, evaluation by the panel members takes place.

Tissue paper products may be used for personal and household use as well as for commercial and industrial use. They may be adapted to absorb fluids, remove dust, and for other cleaning purposes. If tissue paper is to be made out of pulp, the process essentially includes a forming step that includes a headbox- and a forming wire section, and a drying section, either through air drying or conventional drying on a Yankee cylinder. The production process may also include a crepe and, finally, typically a monitoring and winding step.

Several plies may be combined together by a combining operation of a chemical nature (e.g., by adhesive bonding), or of a mechanical nature (e.g., by knurling or so-called edge-embossing), or a combination of both.

Further, the processing to finished tissue product may involve, e.g., longitudinal cut, cross cut, etc. Moreover, individual tissue products may be positioned and brought together to form stacks, which may be individually packaged. Such processing steps may also include application of substances like scents, lotions, softeners or other chemical additives.

When several plies are combined together using adhesive bonding, a film of adhesive is deposited over some or all of the surface of at least one of the plies, then the adhesive-treated surface is placed in contact with the surface of at least one other ply.

When several plies are combined together using mechanical bonding, the plies may be combined by knurling, by compression, by edge-embossing, union embossing and/or ultrasonic bonding. Additionally or as an alternative thereto, at least some bonding can also be carried out using water instead of some other adhesive.

Mechanical and adhesive bonding may also be combined to combine several plies.

The processing step from the base tissue to a finished tissue paper product occurs in processing machines (converting machines) which include operations such as unwinding the base tissue, calendaring of the tissue, laminating, printing or embossing together to form a multi-ply product.

Embossing can be used to change the shape of a ply from flat to shaped, so that there are areas that are raised and/or recessed from the rest of the surface. It therefore constitutes a deformation of the previously flat sheet, and results in a ply having a particular relief. The thickness of the ply or of the multiple plies is increased after embossing compared with its initial thickness.

An embossing process is carried out between an embossing roll and a counter roll. The embossing roll can have protrusions or depressions on its circumferential surface leading to embossed protrusions/depressions in the paper web. Counter rolls may be softer than the corresponding embossing roll and may consist of rubber, such as natural rubber, or plastic materials, paper or steel. If the counter roll is made of a softer material like rubber, a contact area/nip can be formed between the embossing roll (e.g., steel roll) and the counter roll by the deformation of the softer roll.

By embossing, a pattern can be applied to a tissue paper fulfilling a decorative and/or functional purpose. A functional purpose may be to improve the properties of the hygiene paper product, that is, the embossment may improve the product thickness, absorbency, bulk, softness, etc. A functional purpose may also be to provide a joint to another ply in a multi-ply product.

Another type of embossment is referred to herein as a "pre-embossment". A pre-embossment could preferably be applied to a web or ply prior to its joining to the other plies of a multi-ply tissue product.

Such pre-embossment may be made for a functional purpose e.g. as laid out in the above to increase the thickness of the ply, the absorbency, bulk and/or softness.

"Micro-embossment" is used herein for an embossment pattern with a dense configuration. Typically, the micro-embossment may include dots in the range of 25 to 120 dots per cm2. A micro-embossment may advantageously be a pre-embossment. The micro-embossed dots may have different relatively simple surface shapes such as circles, ovals, squares, rectangles or diamonds.

It has become known to produce rolls of tissue paper products, such as household towel, without a core (e.g., without an additional cardboard core), so-called coreless rolls. This is appealing as a reduction of waste is achieved (as the cores of used rolls were a waste product). However, the coreless rolls are not always as satisfying for customers as rolls with a core, e.g., due to a reduced stability in comparison to the rolls with a core.

There is, hence, a need for improved coreless rolls, improving customer satisfaction while nevertheless allowing to reduce waste (by avoiding, in particular, the need of providing cores which usually end up as waste). Specifically, such coreless rolls should address at least one of the above-mentioned shortcomings. Moreover, there is a need for manufacturing methods for improved coreless rolls that address at least one of the above-mentioned shortcomings.

In addition, although the multi-ply tissue paper products and methods for production thereof proposed in the past may be very useful in many applications, there is still a need for improvements. Such improvements would be desirable particularly with respect to the thickness, the strength, the softness, the bulkiness, and/or the absorption capacity of the multi-ply tissue products.

SUMMARY

One aspect of the above-mentioned object is achieved by a coreless roll of a tissue paper product, such as household towel, made of a spirally wound continuous web of tissue paper product having a first end and a second end, the web of tissue paper product being wound such as to define an axially extending inner hole centrally positioned relative to the coreless roll and such that the first end is located on the outer side of the coreless roll and the second end is located at the inner hole.

The diameter of the inner hole, as referred to in this text, may be understood to be an "average diameter" obtained by dividing the perimeter of the inner hole by $\pi$ ($\pi$ may, of course, be approximated, e.g., by 3.14). The actual distance between opposing surfaces of the inner hole may vary as one moves along the perimeter, as the inner hole does not need to have a round cross-sectional shape, but will typically vary a bit (depending, e.g., on the orientation which the roll had during transportation etc.).

The tissue paper product includes two plies, being a first ply and a second ply. In other words, a total number of plies of the tissue paper product is two. Put differently, the tissue paper product consists of two plies. However, the latter statement does not imply that the tissue paper product cannot include other constituents (other than plies), such as adhesive, additives, etc. It means only that the number of plies is two. At least one of the two plies may be an embossed ply. However, both plies may be embossed plies.

The first ply and the second ply have been ply-bonded, optionally using an adhesive such as lamination glue and/or mechanical bonding, such as edge embossing, to form the tissue paper product.

A grammage of the tissue paper product is in a range of 35 to 55 g/m².

The tissue paper product has a Geometric Mean Tensile strength of at least 200 N/m. The first ply and the second ply are made of Conventional Wet Press (CWP) paper.

Producing a ply from paper-making fibers according to "Conventional Wet Paper" (CWP) processing may, e.g., rely on the manufacturing of "Dry Creped Tissue" or "Wet Crepe Tissue" and is to be distinguished from a "Process for Structured Tissue" such as the Through Air Drying (TAD) manufacturing method, the manufacture of un-creped through-air dried (UCTAD) tissue, or alternative manufacturing methods, e.g. the Advanced Tissue Molding System (ATMOS) of the company Voith, or Energy Efficient Technologically Advanced Drying eTAD of the company Georgia Pacific, or Structured Tissue Technology SST of the company Metso Paper.

Moreover, hybrid processes like NTT (New Textured Tissue of the company Metso Paper), which are alternations of the conventional processes, can be used.

The first ply and the second ply have been embossed to be nested.

The nested structure is a results of a process wherein sheets are embossed separately, with patterns that are exactly registered. For example, the macro-embossed areas of the two (or: for other products the more than two) plies are not overlapping (or overlapping only to a small degree, i.e., to 1% or less, optionally to 0.5% or less, of the total macro-embossed areas). This limitation in overlapping may promote a high caliper, high caliper ratio, high resistance to compression of the sheet and consequently high resistance to compression and quality of the coreless roll.

When plies are also micro-embossed (in a separate stage or at the same stage of a converting process), this micro-embossment may be not registered and may not play any role in the lamination process (bonding together of all the plies).

The coreless roll has an outer diameter in the range of 95 to 150 mm, a diameter of the inner hole is in the range of 20 to 50 mm.

A density of the coreless roll is in a range of 70 to 90 kg/m³. The roll density is defined (throughout this text) as the ratio between the weight of the roll and the volume of tissue paper product. The expression "volume of the tissue paper product" is used to refer to the difference between the external volume of the coreless roll and the volume of the inner cylinder defined by the inner hole.

A caliper ratio of the roll is in a range of 40% to 70%. The caliper ratio $(c_s-c_t)/c_t$ is obtained by dividing a difference between a standard caliper $c_s$ of the tissue paper product as defined by the standard ISO-12625-3:2014 and a theoretical caliper $c_t$ of the tissue paper product by the theoretical caliper $c_t$. The theoretical caliper $c_t$ is defined as a ratio between a grammage of the tissue paper product and the density of the roll.

If the caliper ratio is lower than 40%, the radial compression strength of the coreless roll may not be satisfactory. If the caliper ratio is higher than 70%, the embossing load needed to manufacture the coreless roll may have a negative impact on the tensile strength of the tissue paper product.

Whenever reference is made to the "caliper" or "thickness" in this text, reference is made to the thickness as obtained in accordance with the norm ISO 12625-3:2014 using the Frank Thickness Gauge equipment (Model 16502) or the like. The tissue paper sheet to be measured is cut into pieces of minimum 80 mm in any direction and the pieces are conditioned at 23° C., 50% RH (Relative Humidity) for at least 2 hours. During measurement a sample piece is placed between a fixed bottom plate and a pressure foot. The pressure foot is then lowered at a speed of 2.0 mm/s. The thickness value for the sheet is then read after the pressure value is stabilized. The Essity Internal diameter of the pressure foot is 35.7 mm. The lower plate dimension is minimum 20% bigger. The pressure applied is 2.0 kPa during the measurement.

The caliper of the tissue paper product may be at least 0.7 mm.

At least one of the two plies has been embossed with a heated embossing roll.

The first ply may have been embossed with a heated embossing roll. This may promote higher tensile strength, and/or larger caliper of the tissue paper product without (or while hardly) lowering the softness of the tissue paper product as compared to a reference product manufactured analogously but without heat-embossing (i.e., embossing without a heated embossing roll).

The second ply may have been embossed with a heated embossing roll. This may promote higher tensile strength, and/or larger caliper of the tissue paper product without (or while hardly) lowering the softness of the tissue paper product as compared to a reference product manufactured analogously but without heat-embossing (i.e., embossing without a heated embossing roll).

Any heated or heatable embossing roll, as referred to in this text, may be heatable from the inside or outside by a heating means. The heating means may include heat carrying fluid and/or rely on induction and/or infrared heating. However, the heating means may include any type of heating system, there is in this respect no particular limitation.

Any heated or heatable embossing roll, as referred to in this text, may be heatable to a surface temperature in the range of 80° C. to 240° C., optionally 100° C. to 220° C., or 110° C. to 190° C., or 120° C. to 180° C., or 130° C. to 165° C. These temperature ranges may to an increasing degree with narrower ranges promote the manufacturing of a tissue paper product with good shape memory and/or large thickness, high machine direction (MD) and/or cross direction (CD) tensile strength, and good absorption properties.

The references to the temperatures of any heated embossing roll(s), as referred to in this text, are references, in particular, to surface temperatures of the embossing roll. These may be measured, for example, using an infrared thermometer. Moreover, the temperature values refer to temperatures in the steady state of the manufacturing apparatus, i.e., not while running and while plies are in contact with the embossing rolls. In particular, the surface temperature of the heatable embossing roll may drop during manufacturing, due to various effects such as heat conduction to the ply in contact with the roll, etc. For example, a surface temperature of 170° C. might be measured in the steady state (when the embossing roll is not in contact with a ply), and this temperature might decrease to a temperature in the range of 100° C. to 130° C. during manufacturing, etc.

The coreless rolls with a tissue paper product made of two plies described above may have a high caliper ratio combined with a high geometrical mean tensile strength. The nested structure may promote this and allow avoiding the need for mandatory use of hybrid structures (need of at least one expensive structured ply) or heated embossing or specific embossing design to make a good coreless roll with acceptable properties for the consumer.

Due to the high caliper strength, the coreless rolls described above are robust, for example, in terms of their handling and storage properties.

The coreless rolls with a tissue paper product made of two plies described above may have a particularly high radial compression strength. Specifically, the radial compression strength of such rolls may be 20 N or more, or even 25N or more, or even 30N or more. These are robust and meet the requirements, e.g., for household towels. Thus, they may achieve customer satisfaction.

Whenever reference is made to the radial compression strength in this document, reference is made to the radial compression strength measured as follows. A sample coreless roll is inserted into a standard dynamometer with two parallel plates, a top plate and a bottom plate (which are large enough to sandwich a coreless roll and to apply pressure to contact surfaces), the plates, e.g., being metallic plates. The coreless roll is put on the bottom plate, a plastic mandrel is inserted (e.g., a mandrel with a diameter in range of 15 mm to 40 mm) in the inside hole of the coreless roll. The bottom plate and the top plate are then moved towards each other, usually by moving the upper plate towards a lower plate that is fixed and not moveable (using a compression speed of 60 mm/min and, for example, using a dynamometer with a cell of, e.g., 200 N), and it is measured how much pressure (in Newton) needs to be exerted onto the coreless roll until the inside of the coreless roll exerts pressure onto the mandrel. The pressure exerted onto the coreless roll at which in turn the exertion of pressure by the inside of the coreless roll onto the mandrel starts, is the radial compression strength of the coreless roll. A minimum number of five serial measurements may be required in order to obtain a statistically significant result/measurement. The serial measurements need to be performed on separate rolls (from the same production series), in order to obtain reliable results. The sample rolls need to be pre-conditioned, and measurements need to be carried out in accordance with the standard norm ISO187:1985.

The term "structured ply" is, hence, used to refer to a ply manufactured from a web that has undergone a treatment to increase its performance and is used to distinguish it from conventional pressed plies. Specifically, shaping fabrics are engineered for selective densification and creation of a strength network, to create structured plies. In particular, web shaping is performed on the tissue (when still wet), and the tissue is dried, with hydrogen bonding taking place to form the "structure". The manufacturing processes for structured plies may be used to improve softness, bulk, and absorbency at higher strengths, as compared to conventional pressed tissue plies.

TAD plies are manufactured, for example, by using woven knuckles to selectively densify the web and partially define unpressed pockets that preserve initial bulk. When manufacturing a TAD ply, a wet uncompacted web may be dewatered using vacuum boxes, up until reaching about 25-30% solid material (as opposed to about 38-42% when dealing with conventional pressing processes). A molding step may be used to mold the wet web into the 3D topography of the TAD fabric. If dry creping is used, this implies that the yankee surface contact area for creping adhesion is reduced as compared to non-structured manufacturing processes (e.g., 18-30% contact area), so that the drying capacity of the yankee dryer is reduced in comparison to the case of using non-structured tissue. Some TAD plies are manufactured using a one-dryer layout, others using a two-dryer layout. Another option is to use multiple smaller dryers in series. Fabric sanding is frequently used to create a surface for increased yankee contact.

UCTAD is a variant of TAD, wherein "UC" stands for uncreped tissue. The manufacturing process for UCTAD allows eliminating the yankee dryer. However, the absence of creping is a potential weakness for high softness grades. Compensating technologies of fabric crepe, fabric design, and chemistry are employed to boost the softness of the uncreped sheet.

eTAD is another variant of TAD, wherein the "e" stands for energy efficiency, as through air-drying is avoided. A wet web is pressed against a small dryer and then wet creped and/or rush transferred to a TAD type fabric with about 30-60% solid material, before it is dried with a yankee dryer and creped. No air is blown through the web during the drying process.

ATMOS (Advanced Tissue Molding System) is an alternative structured tissue technology. Molding is started at a low solid content using a web topography generated using a structured forming wire. A high-tension permeable belt press is used to dewater the sheet under steam or hot exhaust air showers that are drawn to a vacuum box below the belt. Web solids lie in a range of about 15-35% during this phase. After that, the dewatered sheet is molded and rush transferred on a TAD-like shaping fabric, and then transferred to a yankee dryer (with a content of solids of about 35%). ATMOS technology may be used to lower energy consumption during manufacturing associated with a TAD drum operation.

NTT plies share similarities to the ATMOS plies. Laser engraving on an NTT belt is used, to create a structured pattern. The laser engraving process offers greater flexibility than a woven TAD fabric to create interesting consumer patterns for desirable properties. According to the NTT technology, initial compaction of the sheet in pressing may be avoided.

According to some embodiments, the tissue paper product has a (sheet) caliper of at least 0.55 mm, for some embodiments at least 0.6 mm, and for some embodiments even at least 0.7 mm. These lower thresholds on the caliper may, to an increasing degree with the increasingly larger values indicated as the lower threshold for the caliper, lead to good customer satisfaction, as customers expect a tissue paper product to have a minimum caliper in order to feel a good sensation when dealing with the tissue paper product.

Turning back to coreless rolls in accordance with the present disclosure, and to the tissue paper product, in particular, the first ply may include first embossments with a first height (h1), the first height (h1) being in a range of 0.2 mm to 2.0 mm.

The second ply may include second embossments with a second height (h2), the second height (h2) being in a range of 0.2 mm to 2.0 mm.

The adhesive, such as lamination glue, may be applied to tips of the first embossments of the first ply and/or to tips of the second embossments of the second ply.

The first ply may include third embossments with a third height (h3) smaller than the first height h1 (h1>h3). In other words, adhesive may be applied to tips of the higher embossments (i.e., those with a larger embossing height). The third height (h3) may lie in a range of 0.1 mm to 1.2 mm.

The third embossments (if present) may have been formed by the same embossing roll that was used to form the first embossments or, alternatively, by a different (heatable or non-heatable) embossing roll.

According to some embodiments, the first embossments have been formed by a first heated embossing roll. If the embossing is performed with the first heated embossing roll, i.e., if heat-embossing is performed, this may promote higher tensile strength, and/or higher absorption capacity without (or while hardly) lowering the softness of the tissue paper product as compared to a reference product manufactured analogously but without heat-embossing (i.e., embossing without a heated embossing roll).

According to some embodiments, the second embossments have been formed by a second heated embossing roll. If the embossing is performed with the second heated embossing roll, i.e., if heat-embossing is performed, this may promote higher tensile strength, and/or higher absorption capacity without (or while hardly) lowering the softness of the tissue paper product as compared to a reference product manufactured analogously but without heat-embossing (i.e., embossing without a heated embossing roll).

According to some embodiments, the third embossments have been formed by a third heated embossing roll. If the embossing is performed with the third heated embossing roll, i.e., if heat-embossing is performed, this may promote higher tensile strength, and/or higher absorption capacity without (or while hardly) lowering the softness of the tissue paper product as compared to a reference product manufactured analogously but without heat-embossing (i.e., embossing without a heated embossing roll).

According to some embodiments, the first ply has been moistened, prior to having been embossed, with an amount of liquid, such as water, in the range of 2% to 12% of the basis weight of the first ply, or optionally 4% to 10% of the basis weight of the first ply, wherein the liquid optionally is provided with one or several additives, or wherein the first ply has not been moistened with a liquid prior to having been embossed.

A geometrical mean tensile strength of tissue paper products of the coreless roll including two plies may lie in a range of 200 N/m to 500 N/m, optionally 200 N/m to 370 N/m. The geometrical mean tensile (GMT) strength refers to the square root of the product of the machine direction tensile strength (MDT) strength and the cross-directional tensile (CDT) strength. Whenever reference is made to a "tensile strength" in this text, the tensile strengths in question can be measured and compared as dry tensile strengths following the standard EN ISO 12625-4:2016 (the aforementioned ranges pertain to dry tensile strength) or as wet tensile strengths following the standard ISO 12625-5:2017.

The dry strength is determined according to EN ISO 12625-4:2016, Tissue Paper and Tissue Products, Part 4: Determination of width-related breaking strength, elongation at break and tensile energy absorption. For exemplary purposes, the tensile tester used for the measurement featured two clamps of 50 mm width. Each clamp can grip the test piece firmly, but without damage, along a straight line across the full width of the test piece (the clamping line). The distance between the clamping lines was set at 100 mm. For special tests, the distance is reduced if the available length of the sample is lower than 100 mm (e.g., toilet tissue in cross direction). The tissue paper product to be measured, i.e., two sheets of a single-ply or multi-ply product, was cut into test pieces of 50 mm wide with parallel edges. Each sheet was cut into two different types of test pieces by cutting in the machine direction and in the cross direction. The obtained test pieces were then conditioned in an atmosphere of 23° C., 50% RH (Relative Humidity) for at least 4 hours. The test piece to be measured was placed between the clamps without any strain, and such that any observable slack is eliminated. At the beginning, a pre-tensile force of 25 cN is applied (zero of stretch) then the elongation rate between the clamps was kept constant at 5 cm/min. The maximum tensile force required to break the test piece was obtained. The measurement was repeated with six test pieces and the values obtained were averaged. The dry tensile strength was calculated by means of the following formula: Mean dry tensile strength [N/m]=(mean maximum tensile force [N]/initial width of the test piece [mm])×10<3.

The wet strength was determined according to EN ISO 12625-5:2016 Tissue Paper and Tissue Products, Part 5: determination of width-related wet load at break, 2016. (optionally the following description which follows the principles of the DIN NORM). For exemplary purposes, when experimentally verifying the wet strength of a product, the tensile test was accordingly performed by means of an electronic tensile test apparatus (Model 1122, Instron Corp., Canton, Mass., USA) with a constant rate of elongation of 50 mm/min using a Finch device. To prepare the test strips, 6 samples each having a length of 150 mm and a width of 50 mm were cut from the raw tissue (single ply) prepared in such a manner that the longitudinal direction of the test strips coincided with the machine direction (MD) or cross-direction (CD). The free clamping length when using the Finch clamp was about 50 mm. The test strip was secured with both ends in a clamp of the test apparatus. The other end (loop) formed in this way was placed around a pin and treated at 23° C. with distilled water until complete saturation. The depth of immersion of the loop formed by the test strip is at least 20 mm. The soaking duration (immersion time) is 15 s, the rate of elongation is set to a constant (50±2) mm/min, the measurement of the breaking strength is performed on the sample immersed in distilled water. Six test strips at a time were measured, the result being indicated as an arithmetic mean. To ensure that the wet strength of the samples has fully developed, which is particularly necessary in the case of samples in which additional wet-strength agents were used to boost wet strength, e.g., by their addition in the mass, the samples to be tested were always artificially aged before conducting the tensile test. Aging was effected by heating the samples in an air-circulating drying cabinet to (80±1° C.) for a period of 30 min. Six test strips at a time were measured, the result being indicated as an arithmetic mean.

Another aspect of the above-mentioned object is achieved by a coreless roll of a tissue paper product, such as household towel, with three plies, in accordance with the present disclosure. The coreless roll is made of a spirally wound continuous web of tissue paper product having a first end and a second end. The web of tissue paper product is wound such as to define an axially extending inner hole centrally positioned relative to the coreless roll and such that the first end is located on the outer side of the coreless roll and the second end is located at the inner hole.

The tissue paper product includes three plies, being a first ply, a second ply, and a third ply.

The three plies are ply-bonded. According to some embodiments, they may be bonded with an adhesive, such as lamination glue, and/or with mechanical bonding, such as edge embossing, to form the tissue paper product.

The tissue paper product includes three plies: a first ply, a second ply, and a third ply, wherein the first ply is one of the outermost plies of the tissue paper product. In other words, a total number of plies of the tissue paper product is three. Put differently, the tissue paper product consists of three plies. However, the latter statement does not imply that the tissue paper product cannot include other constituents (other than plies), such as adhesive, additives, etc. It means only that the number of plies is three. At least one of the three plies is an embossed ply. One of the three, two of the three, or all three plies may be embossed plies.

A grammage of the tissue paper product is in a range of 45 g/m$^2$ to 75 g/m$^2$.

The tissue paper product has a Geometric Mean Tensile strength of at least 250 N/m.

The first ply, the second ply, and the third ply are made of Conventional Wet Press (CWP) paper, respectively.

The first ply, the second ply, and the third ply have been embossed to be nested, The coreless roll has an outer diameter in the range of 95 to 150 mm, a diameter of the inner hole is in the range of 20 to 50 mm, and a density of the coreless roll is in a range of 65 to 125 kg/m$^3$.

A caliper ratio of the roll is in a range of 10% to 45%. The caliper ratio $(c_s-c_t)/c_t$ is obtained by dividing a difference between a standard caliper $c_s$ of the tissue paper product as defined by the standard ISO-12625-3:2014 and a theoretical caliper $c_t$ of the tissue paper product by the theoretical caliper $c_t$. The theoretical caliper $c_t$ is defined as a ratio between a grammage of the tissue paper product and the density of the roll.

According to some embodiments, the caliper of the tissue paper product is at least 0.7 mm.

According to some embodiments, at least one of the three plies has been embossed with a heated embossing roll. However, two of the three or all three plies may be embossed with a heated embossing roll.

The coreless roll may have a cross directional (CD) wet tensile of at least 40 N/m, optionally at least 45 N/m.

The third ply may be positioned between the first ply and the second ply.

The first ply may include first embossments with a first height (h1), the first height (h1) being in a range of 0.2 mm to 2.0 mm.

The second ply may include second embossments with a second height (h2), the second height (h2) being in a range of 0.2 mm to 2.0 mm.

The adhesive, such as lamination glue, may be applied to tips of the first embossments of the first ply and/or tips of the second embossments of the second ply.

The first ply may include third embossments with a third height (h3) smaller than the first height h1 (h1>h3). The third height (h3) may be in a range of 0.1 mm to 1.2 mm.

According to some embodiments, the third ply has not been embossed prior to ply-bonding. Sometimes, the third ply (the middle ply) may be referred to as an unembossed ply. With "unembossed", it is meant that the third ply is not pre-embossed prior to the final ply-bonding being carried out. That is, the third ply may no longer be flat after the ply-bonding, but has not beforehand been embossed using an embossing roll. According to some embodiments, the third ply is partially embossed at locations where it is ply-bonded with the first ply or the second ply.

The coreless rolls with a tissue paper product made of three plies described above may have a high caliper ratio combined with a high geometrical mean tensile strength. The nested structure may promote this and allow avoiding the need for mandatory use of hybrid structures (need of at least one expensive structured ply) or heated embossing or specific embossing design to make a good coreless roll with acceptable properties for the consumer.

Due to the high caliper strength, the coreless rolls described above are robust, for example, in terms of their handling and storage properties.

The coreless rolls with a tissue paper product made of three plies described above may have a particularly high radial compression strength. Specifically, the radial compression strength of such rolls may be 20 N or more, or even 25N or more, or even 30N or more. These are robust and meet the requirements, e.g., for toilet paper rolls. Thus, they may achieve customer satisfaction.

According to some embodiments, the first ply and the third ply have been embossed together to form the first embossments on the first ply and the third ply.

According to some embodiments, the third embossments have been formed only on the first ply but not on the third ply, or, wherein, optionally, the first ply and the third ply have been embossed together to form the third embossments on the first ply and the third ply.

According to some embodiments, the first embossments have been formed by a first heated embossing roll. If the embossing is performed with the first heated embossing roll, i.e., if heat-embossing is performed, this may promote higher tensile strength, and/or higher absorption capacity without (or while hardly) lowering the softness of the tissue paper product as compared to a reference product manufactured analogously but without heat-embossing (i.e., embossing without a heated embossing roll).

According to some embodiments, the second embossments have been formed by a second heated embossing roll. If the embossing is performed with the second heated embossing roll, i.e., if heat-embossing is performed, this may promote higher tensile strength, and/or higher absorption capacity without (or while hardly) lowering the softness of the tissue paper product as compared to a reference product manufactured analogously but without heat-embossing (i.e., embossing without a heated embossing roll).

According to some embodiments, the third embossments have been formed by the first heated embossing roll or by a third heated embossing roll. If the embossing is performed with the third heated embossing roll, i.e., if heat-embossing is performed, this may promote higher tensile strength, and/or higher absorption capacity without (or while hardly) lowering the softness of the tissue paper product as compared to a reference product manufactured analogously but without heat-embossing (i.e., embossing without a heated embossing roll).

According to some embodiments, the first ply and the third ply have been embossed together to form the first embossments on the first ply and the third ply.

According to some embodiments, the third embossments have been formed only on the first ply, but not on the third ply. According to other embodiments, the first ply and the third ply have been embossed together to form the third embossments on the first ply and the third ply.

The third ply (i.e., the middle ply) may include fourth embossments with a fourth height (h4), the fourth height (h4) being in a range of 0.2 mm to 2.0 mm. The third ply may have been embossed separately from the first ply and the second ply. According to some embodiments, the fourth embossments have been formed by a fourth heated embossing roll.

The third embossments (if present) may have been formed by the same heated embossing roll that was used to form the first embossments, or, alternatively, by a different (heatable or non-heatable) embossing roll.

According to some embodiments, the first ply has been moistened, prior to having been embossed, with an amount of liquid, such as water, in the range of 2% to 12% of the basis weight of the first ply, or optionally 4% to 10% of the basis weight of the first ply. The liquid may have been provided with one or several additives, or the first ply may have not been moistened with a liquid prior to having been embossed.

The coreless rolls with a tissue paper product made of three plies described above may have a particularly high radial compression strength. Specifically, the radial compression strength of such rolls may be 30 N or more, or even 40N or more, or even 45N or more. These are robust and meet the requirements, e.g., for household towels. This property may be increasingly promoted by the increasingly narrower ranges of grammage specified for the three-ply tissue paper product.

A geometrical mean tensile strength of tissue paper products of the coreless roll including three plies may lie in a range of 250 N/m to 600 N/m, optionally 250 N/m to 530 N/m, or 250 N/m to 460 N/m (the ranges all pertain to dry tensile strengths).

Another aspect of this disclosure relates to a coreless roll of a tissue paper product, such as household towel, that is structured as follows. The coreless roll is made of a spirally wound continuous web of tissue paper product having a first end and a second end. The web of tissue paper product is wound such as to define an axially extending inner hole centrally positioned relative to the coreless roll and such that the first end is located on the outer side of the coreless roll and the second end is located at the inner hole.

The tissue paper product includes at least two plies, including at least a first ply and a second ply, the first ply being one of the outermost plies of the tissue paper product. A total number of plies of the tissue paper product is between 2 and 4. The between 2 and 4 plies are ply-bonded, optionally with an adhesive, such as lamination glue, and/or mechanical bonding, such as edge embossing, to form the tissue paper product.

The tissue paper product having a Geometric Mean Tensile strength of at least 200 N/m.

A grammage of the tissue paper product is in a range of 35 g/m² to 75 g/m². The plies have been embossed to be nested.

The coreless roll has an outer diameter in the range of 95 to 150 mm. A diameter of the inner hole is in the range of 20 to 50 mm. A density of the coreless roll being in a range of 65 to 120 kg/m³.

A caliper ratio of the roll is in a range of 40%-70% if the total number of plies is 2, and the caliper ratio of the roll is in a range of 10%-45% if the total number of plies is 3, the caliper ratio $(c_s-c_t)/c_t$ being obtained by dividing a difference between a standard caliper $c_s$ of the tissue paper product as defined by the standard ISO-12625-3:2014 and a theoretical caliper $c_t$ of the tissue paper product by the theoretical caliper $c_t$. The theoretical caliper $c_t$ is defined as a ratio between a grammage of the tissue paper product and the density of the roll.

The coreless roll has a radial compression strength of 20 N or more, optionally of 25N or more, or of 30N or more.

The coreless rolls with a tissue paper product described above may have a particularly high radial compression strength. Specifically, the radial compression strength of such rolls may be 20 N or more, or even 25N or more, or even 30N or more. These are robust and meet the requirements, e.g., for household towels. This property may be increasingly promoted by the increasingly narrower ranges of grammage specified for the three-ply tissue paper product.

A geometrical mean tensile strength of tissue paper products of the coreless roll including three plies may lie in a range of 200 N/m to 600 N/m, optionally 200 N/m to 530 N/m, or 200 N/m to 460 N/m.

In the case of any embodiment (or any combination of embodiments, in so far the features of the different embodiments are not incompatible) of a tissue paper product described above (irrespective of the number of plies, etc., and irrespective of which of all of the above-described aspects is chosen), at least a part of an innermost circumvolution, optionally the entire innermost circumvolution, of the absorbent material of the coreless roll at the second end may include a stabilizing coating composition. This may aid in promoting good radial and/or axial stability of the coreless roll.

The coating composition may include at least one of the following list: a polymer including oxygen and/or nitrogen atoms, a non-ionic polymer such as a non-ionic cellulose ether, polyether polyol.

The coating composition may include water.

When the coating composition includes a nonionic polymer, the ionic demand may be in a range of from $-1000$ to $+100$ $\mu$eq/g, or $-500$ to $+50$ $\mu$eq/g, or $-50$ to $0$ $\mu$eq/g.

The coating composition may be applied to only one side of the innermost turn. This one side may be side oriented towards the axially extending inner hole.

Another aspect of this disclosure relates to a method of manufacturing a coreless roll of a tissue paper product, such as household towel, the tissue paper product being made of two plies. The method includes the steps of:

providing a first ply of Conventional Wet Press paper (CWP) and a second ply of Conventional Wet Press paper (CWP);

embossing the two plies such that they are nested and ply-bonding the two plies, optionally with an adhesive, such as a lamination glue, and/or with mechanical bonding, such as edge embossing, to form a tissue paper product with a grammage in a range of 35 $g/m^2$ to 55 $g/m^2$, a Geometric Mean Tensile strength of at least 200 N/m, and a caliper ratio in a range of 40% to 70%;

spirally winding up the tissue paper product on a mandrel to form a coreless roll and to define an axially extending inner hole, with a first end of the tissue paper product being located on the outer side of the coreless roll and the second end being located at the inner hole; and withdrawing the mandrel;

wherein the coreless roll includes an outer diameter in the range of 95 to 150 mm and a diameter of the inner hole is in the range of 20 to 50 mm, and the density of the coreless roll lies in a range of 70 to 90 $kg/m^3$.

The caliper ratio may be adjusted by adjusting the embossing pressure during the manufacturing process.

The coreless rolls manufactured by the method may have the same benefits as the coreless rolls with two plies described above. In other words, features of the coreless rolls of any of the embodiments described above translate into corresponding features of an embodiment of the method, and vice versa. For the sake of conciseness, benefits which may be associated with particular features of an embodiment of the product will not be discussed for the corresponding method claims, but reference is instead made on a general basis now to the respective passage of the description relating to embodiments of the product.

The caliper of the manufactured tissue paper may be at least 0.7 mm.

According to some embodiments, the method includes the step of heat-embossing at least one of the two plies.

The method may include the step of embossing the first ply with a first embossing roll with first embossing protrusions to form first embossments with a first height (h1) in a range of 0.2 mm to 2.0 mm.

The method may include the step of embossing the second ply with a second embossing roll with second embossing protrusions to form second embossments with a second height (h2) in a range of 0.2 mm to 2.0 mm.

According to some embodiments, the heated embossing roll also includes third embossing protrusions, and the embossing of the first ply may include forming first and third embossments on the first ply. According to other embodiments, the method includes a step of embossing the first ply with a third embossing roll with third embossing protrusions to form third embossments. In other words, a second type of embossments may be formed on the first ply either with one and the same embossment roll as used for the first embossments, or they may be formed with another embossing roll. Analogous statements hold for yet further types of embossments (different types referring to embossments with different shapes and/or different embossment heights, etc.). The third embossing protrusions may be formed with a height (h3) in range of 0.1 mm to 1.2 mm.

Another aspect of this disclosure relates to a method of manufacturing a coreless roll of a tissue paper product, such as household towel, the tissue paper product being made of three plies. The method includes the steps of:

providing a first ply of Conventional Wet Press paper (CWP), a second ply of Conventional Wet Press paper (CWP), and a third ply of Conventional Wet Press paper (CWP);

embossing the three plies such that they are nested and ply-bonding the three plies, optionally with an adhesive, such as a lamination glue, and/or with mechanical bonding, such as edge embossing, to form a tissue paper product with a grammage in a range of 45 $g/m^2$ to 75 $g/m^2$, a Geometric Mean Tensile strength of at least 250 N/m, and a caliper ratio in a range of 10% to 40%;

spirally winding up the tissue paper product on a mandrel to form a coreless roll and to define an axially extending inner hole, with a first end of the tissue paper product being located on the outer side of the coreless roll and the second end being located at the inner hole; and withdrawing the mandrel;

wherein the coreless roll includes an outer diameter in the range of 95 to 150 mm and a diameter of the inner hole is in the range of 20 to 50 mm, and the density of the coreless roll lies in a range of 65 to 125 $kg/m^3$.

The caliper ratio may be adjusted by adjusting the embossing pressure during the manufacturing process.

The tissue paper products manufactured by the method may have analogous benefits as the tissue paper products with three plies described above. In other words, features of the tissue paper products of any of the embodiments described above translate into corresponding features of an embodiment of the method, and vice versa. For the sake of conciseness, benefits which may be associated with particular features of an embodiment of the product will not be discussed for the corresponding method claims, but reference is instead made on a general basis now to the respective passage of the description relating to embodiments of the product.

The caliper of the manufactured tissue paper may be at least 0.7 mm.

The method may include embossing the first ply with a first embossing roll with first embossing protrusions to form first embossments with a first height (h1) in a range of 0.2 mm to 2.0 mm.

The method may include embossing the second ply with a second embossing roll with second embossing protrusions to form second embossments with a second height (h2) in a range of 0.2 mm to 2.0 mm.

The first, second, and third plies are ply-bonded such that the third ply is located between the first ply and the second ply.

According to some embodiments, the heated embossing roll also includes third embossing protrusions, and the step of embossing the first ply forms first and third embossments on the third ply. The third embossing embossments may have a height (h3) in range of 0.1 mm to 1.2 mm. According to other embodiments, the method includes a step of embossing the first ply with a third embossing roll with third embossing protrusions to form third embossments, the third embossing embossments may have a height (h3) in range of 0.1 mm to 1.2 mm. In other words, a second type of embossments may be formed on the first ply either with one and the same embossment roll as used for the first embossments, or they may be formed with another embossing roll. Analogous statements hold for yet further types of embossments (different types referring to embossments with different shapes and/or different embossment heights, etc.).

The third ply may, according to some embodiments, not be embossed. In other words, the third ply may be a flat ply in the sense of not being (pre-) embossed by an embossing roll prior to the ply-bonding taking place. It need not be flat after the ply-bonding in the sense that the ply-bonding may remove flatness of the third ply.

The first ply and the third ply may be embossed together using the first embossing roll to form the first embossments on the first ply and the third ply.

According to some embodiments, the third embossments are formed only on the first ply but not on the third ply. According to other embodiments, the first ply and the third ply are embossed together to form the third embossments on the first ply and the third ply.

The first embossments on the first ply may be formed by a first heated embossing roll.

The second embossments on the second ply may be formed by a second heated embossing roll.

The third embossments may be formed by the heated embossing roll or a third heated embossing roll.

The method may include a step of forming fourth embossments with a fourth height (h4) on the third ply with a fourth embossing roll, the fourth height (h4) being in a range of 0.2 mm to 2.0 mm, wherein the third ply is embossed separately from the first ply and the second ply.

The fourth embossments may be formed by a fourth heated embossing roll.

This disclosure also relates to coreless rolls of a tissue paper product manufactured according to any one (or any combination of, in so far not incompatible) embodiments of the method in accordance with the present disclosure.

Additional advantages and features of the present disclosure, that can be realized on their own or in combination with one or several features discussed above, insofar as the features do not contradict each other, will become apparent from the following description of particular embodiments.

BRIEF DESCRIPTION OF THE DRAWINGS

For a better understanding of the present disclosure and to show how the same may be carried into effect, reference will now be made, by way of example only, to the accompanying drawings, in which:

The description is given with reference to the accompanying drawings, in which:

FIG. 1 is a schematic representation of a coreless roll 1 in accordance with the present disclosure.

Figure 1:
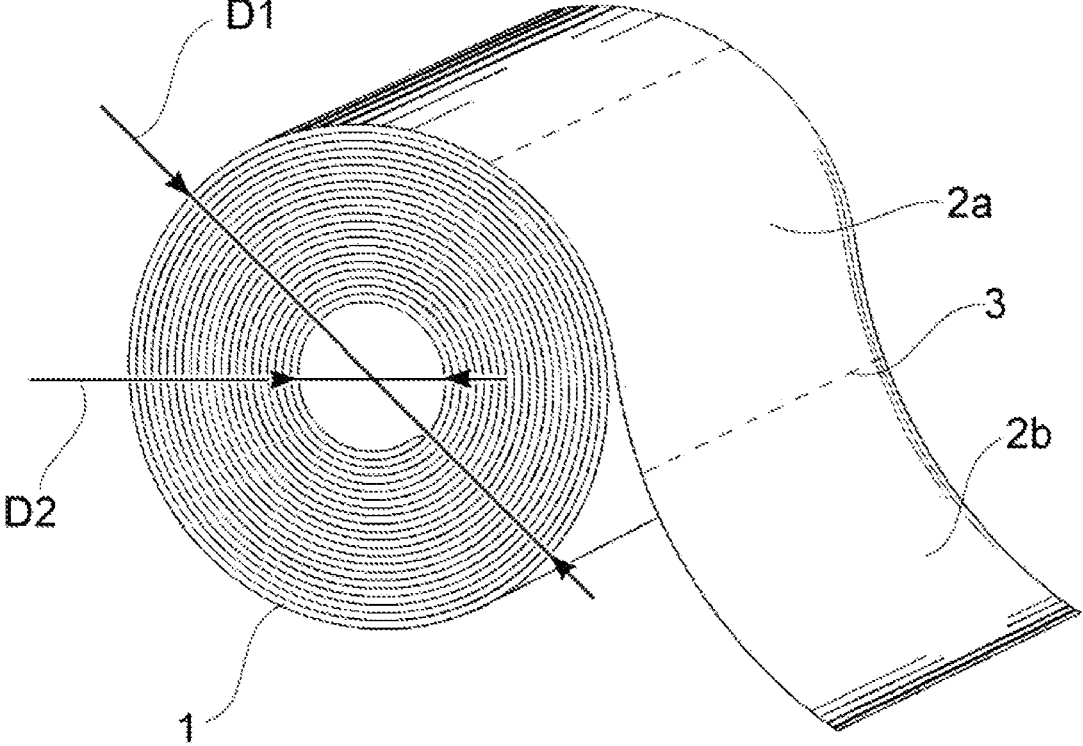
FIG. 1 is a perspective view of a coreless roll in accordance with the present disclosure.

The coreless roll 1 of FIG. 1 represents embodiments with a different tissue paper products with two or three plies. All of the plies of these embodiments are made of Conventional Wet Press (CWP) paper).

The embodiments of FIG. 1 are household towel rolls including a tissue paper product that includes different sheets 2a, 2b which can be easily separated along a perforation line 3. However, other embodiments may not include such perforation lines.

The coreless roll 1 of FIG. 1 is made of a spirally wound continuous web of tissue paper product having a first end and a second end, the web of tissue paper product being wound such as to define an axially extending inner hole centrally positioned relative to the coreless roll 1 and such that the first end is located on the outer side of the coreless roll 1 and the second end is located at the inner hole.

The outer diameter D1 of the coreless roll 1 is in a range of 95 to 150 mm. The diameter D2 of the inner hole of the roll 1 is in a range of 20 to 50 mm. The density of the coreless roll 1 is in a range of 65 to 125 kg/m³ (narrower ranges for the respective numbers of plies of the tissue paper products are indicated above).

The tissue paper product of the embodiments of FIG. 1 is ply-bonded using an adhesive (a lamination glue). However, this is by no means limiting. In the case of other embodiments, the plies may, e.g., be ply-bonded using mechanical bonding, such as edge embossing. In other words, there is no need to use an adhesive, and other embodiments may be "glueless". A further alternative is that both an adhesive as well as mechanical bonding are used.

The grammage of the tissue paper products depends on the numbers of plies. It is in a range of 35 to 75 g/m² (narrower ranges for the respective numbers of plies are indicated above).

A caliper ratio of the roll is in a range of 10% to 70% (narrower ranges for the respective numbers of plies are indicated above), wherein the caliper ratio $(c_s-c_t)/c_t$ is obtained by dividing a difference between a standard caliper $c_s$ of the tissue paper product as defined by the standard ISO-12625-3:2014 and a theoretical caliper $c_t$ of the tissue paper product by the theoretical caliper $c_t$, and the theoretical caliper $c_t$ being defined as a ratio between a grammage of the tissue paper product and the density of the roll. The caliper ratio can be varied conveniently by varying the embossing pressure during manufacturing of the respective tissue paper product.

The radial compression strength of the coreless rolls 1 of FIG. 1 is at least 30 N or more. However, according to other embodiments, it is at least 20 N or more or at least 25 N or more. This provides robustness to a household towel (e.g., to achieve customer satisfaction, but also for packing purposes, etc.) and is achieved despite the fact the roll 1 is coreless. As the roll is coreless, waste is reduced, and the roll in question may be considered as environment-friendly.

The (sheet) caliper of the roll 1 is at least 0.7 mm.

Figure 2:
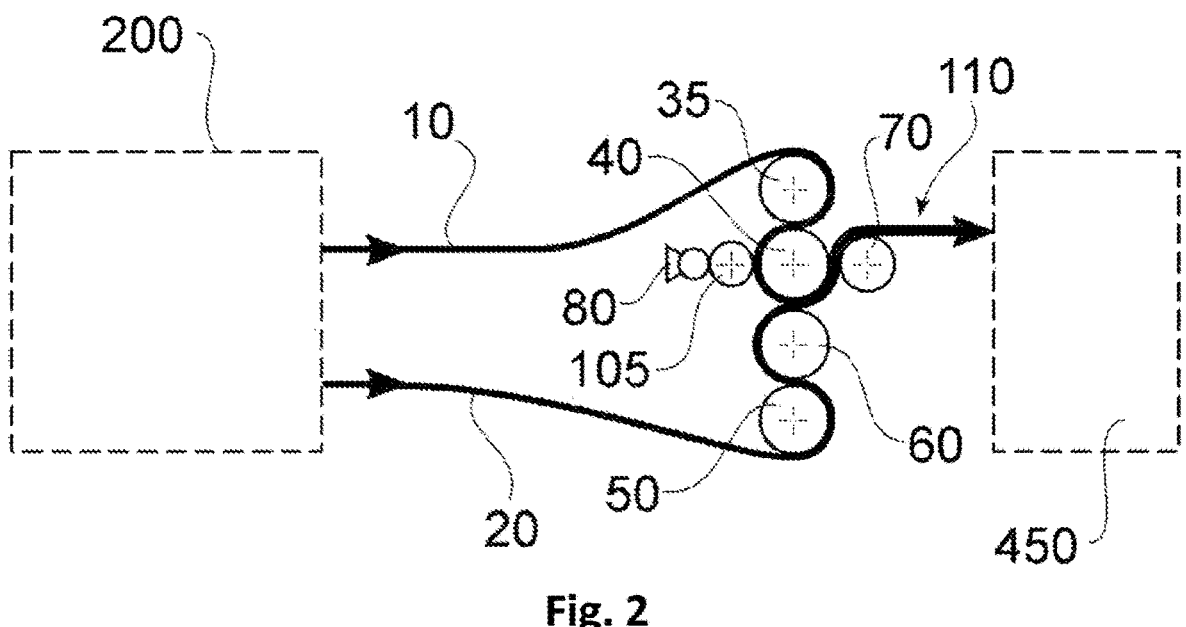
FIG. 2 is a schematic representation of (a part of) an embodiment of a manufacturing apparatus for manufacturing a coreless roll in accordance with the present disclosure with a first embodiment of a method in accordance with the present disclosure.

FIG. 2 is a schematic representation of (a part of) and embodiment of a manufacturing apparatus for manufacturing a coreless roll in accordance with the present disclosure using a first embodiment of a method in accordance with the present disclosure.

The box 200 in FIG. 2 schematically represents any constituents of the manufacturing apparatus that are used prior to those illustrated in FIG. 2 in more detail. For example, the box 200 may involve unwinding rolls for unwinding a first ply 10 and a second ply 20.

The first ply 10 and the second ply 20 are made of Conventional Wet Press (CWP) paper. In the case of the embodiment of FIG. 2, they are single plies. However, for example, the first ply 10 may, for other embodiments, e.g., be replaced by two plies that are embossed together.

The first ply 10 is embossed between a non-heatable embossing roll 40 (this roll may be replaced by a heatable embossing roll that may be, e.g., be heated to a steady-state temperature in the range of 80° C. to 240° C., in the case of some embodiments) and a counter roll 35. An adhesive supplying unit with a glue chamber 80 is provided adjacent to the roll 40. An applicator roll 105 is used to homogeneously transfer adhesive (dosed by cavities engraved in an anilox roll positioned between the glue chamber 80 and the applicator roll 105) to the first ply 10 prior to ply-bonding being carried out.

The second ply 20 is embossed between an embossing roll 50 and a counter roll 60. The roll 50 is in this case not heated, but it may be a heatable embossing roll 50 and may be, e.g., heated to a steady-state temperature in the range of 80° C. to 240° C., in the case of some embodiments.

The first ply 10 and the second ply 20 are then ply-bonded between the embossing roll 40 and a marrying roll 70. The ply-bonded tissue paper product 110 including (at least two plies) is then conveyed further.

The box 450 represents any components of the manufacturing apparatus of FIG. 2 used subsequently to those described in more detail above. In particular, the box 450 may include a winding unit for winding up the manufactured tissue paper product 110, as well as further units for manufacturing a coreless roll.

Figure 3:
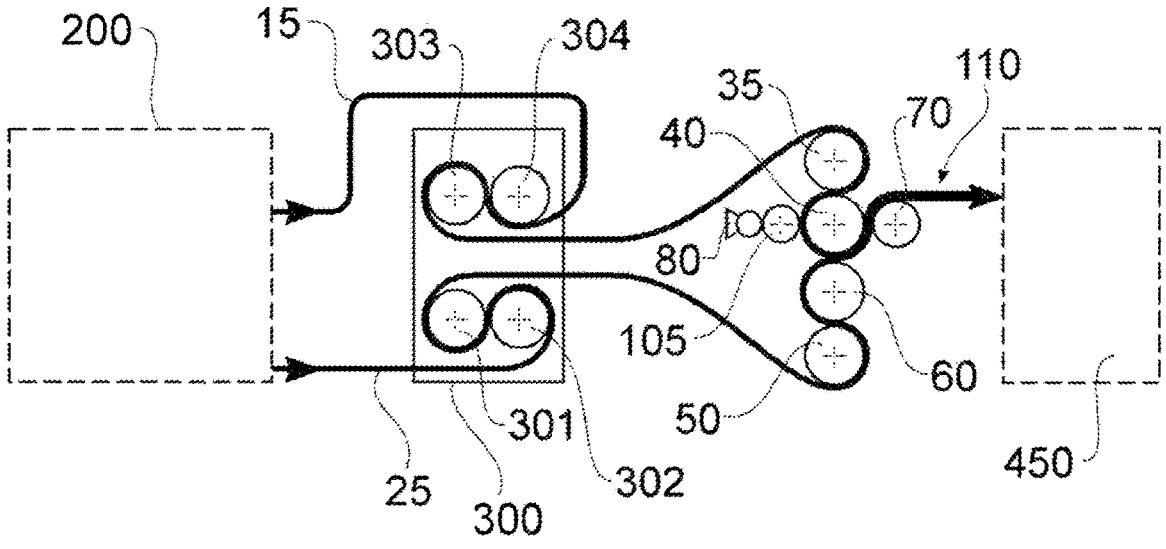
FIG. 3 is a schematic representation of (a part of) an embodiment of a manufacturing apparatus for manufacturing a coreless roll in accordance with the present disclosure with a second embodiment of a method in accordance with the present disclosure.

FIG. 3 is a schematic representation of (a part of) an embodiment of a manufacturing apparatus for manufacturing a coreless roll in accordance with the present disclosure using a second embodiment of a method in accordance with the present disclosure.

The box 200 in FIG. 3 schematically represents any constituents of the manufacturing apparatus that are used prior to the later stages illustrated in more detail. For example, the box 200 may involve unwinding rolls for unwinding a first ply 15 and a second ply 25.

The first ply 15 and the second ply 25 are supplied to a pre-embossing station 300. The pre-embossing station 300 includes rolls 303 and 304 for pre-embossing the first ply 15 and rolls 301 and 302 for pre-embossing the second ply 25. One or any selection of the rolls 301, 302, 303, and 304 may be replaced by heatable embossing roll that may be, e.g., be heated to a steady-state temperature in the range of 80° C. to 240° C., in the case of some embodiments.

The first ply 15 is then conveyed towards the main embossing and ply bonding station. The first ply 15 is, in particular, embossed between the embossing roll 40 and the counter roll 35. An adhesive supplying unit with a glue chamber 80 is provided adjacent to the embossing roll 40. An applicator roll 105 is used to homogeneously transfer adhesive (dosed by cavities engraved in an anilox roll positioned between the glue chamber 80 and the applicator roll 105) to the first ply 15 prior to the final ply-bonding being carried out.

The second ply 25 is conveyed towards the rolls 50 and 60 and is embossed between the embossing roll 60 and the counter roll 50. Ply-bonding of the first ply 15 and the second ply 25 is carried out between the embossing roll 40 and a marrying roll 70. The ply-bonded tissue paper product 110 including (at least two plies) is then conveyed further.

The box 450 represents any components of the manufacturing apparatus of FIG. 3 used subsequently to the steps described so far. In particular, the box 450 may include a winding unit for winding up the manufactured tissue paper product 110, as well as further units for manufacturing a coreless roll.

Figures 4, 5, 6, 7:
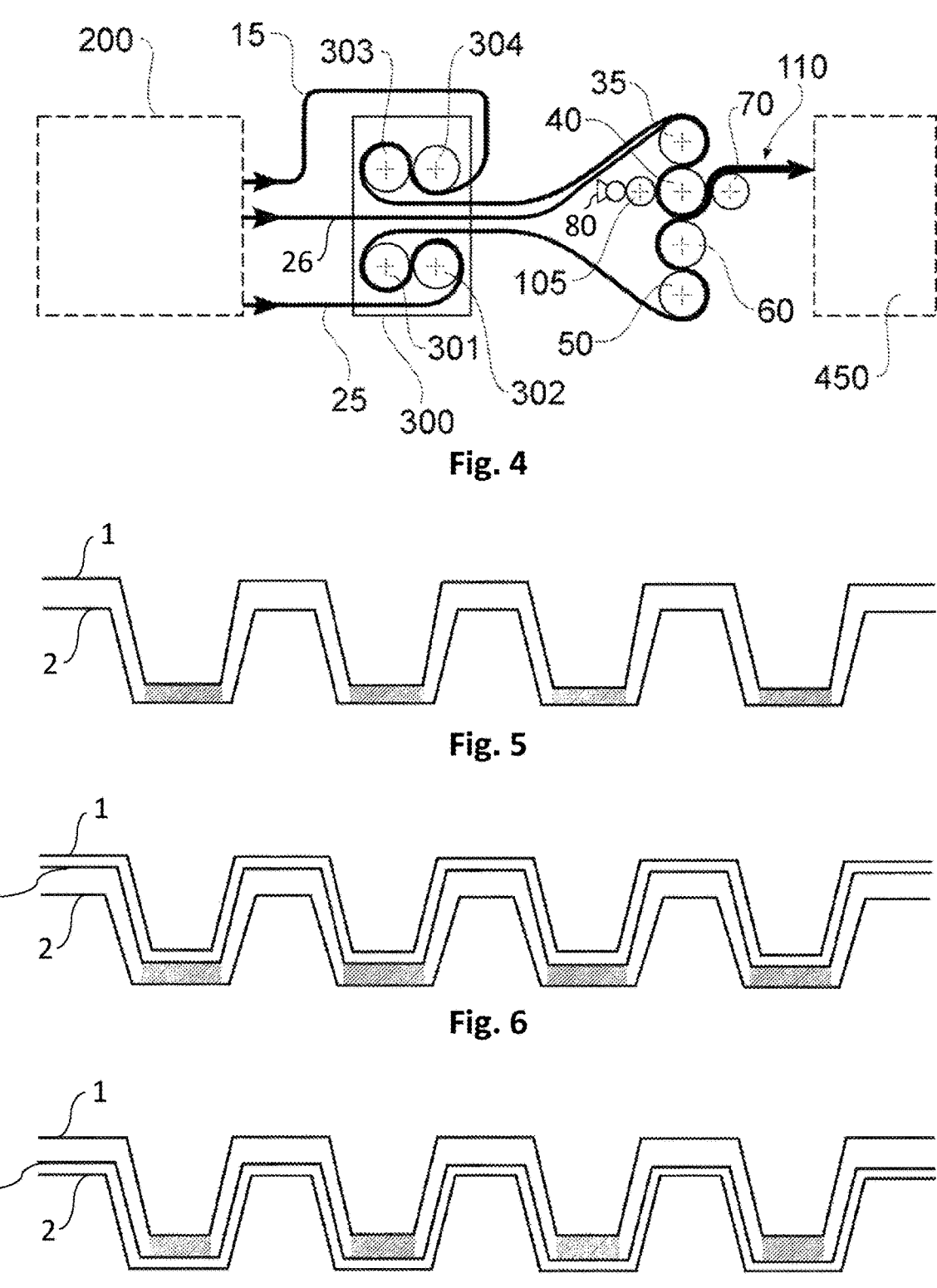
FIG. 4 is a schematic representation of (a part of) an embodiment of a manufacturing apparatus for manufacturing a coreless roll in accordance with the present disclosure with a third embodiment of a method in accordance with the present disclosure.
FIGS. 5-7 depict embodiments of tissue paper products which are constituents of coreless rolls in accordance with the present disclosure.

FIG. 4 depicts an apparatus used for carrying out a method in accordance with the present disclosure for manufacturing a coreless roll including a tissue paper product including (at least) three plies made of CWP.

Most of what is shown is analogous to what was explained above with respect to FIG. 3. Reference is thus made to the corresponding explanations. A difference is that a third ply 26 is additionally supplied. It is led to the embossing roll 40, where it is conveyed further together with the first ply 15. The first ply 15 and the third ply 26 are then ply-bonded together with the second ply 25 between the embossing roll 40 and the marrying roll 70.

In each of the cases of FIGS. 2 to 4, the respective embodiments corresponding to the figure in question may include one or more heatable embossing rolls5

FIGS. 5 to 7 depict a number of embodiments of tissue paper products which are spirally wound up to form coreless rolls in accordance with the present disclosure.

The tissue paper product of FIG. 5 include two plies: a top ply 1 and a bottom ply 2. Both the top ply 1 and the bottom ply 2 include embossments.

The top ply 1 and the bottom ply 2 are both made of Conventional Wet Press (CWP) paper and constitute a "first ply" and a "second ply" in the sense of the appended claims.

A grammage of the tissue paper product of FIG. 5 in a range of 35 to 55 g/m², respectively.

The embodiments of FIGS. 6 and 7 include exactly three plies: a top ply 1, a bottom ply 2, and a middle ply 3.

All three plies 1, 2, 3 are made of Conventional Wet Press (CWP) paper.

In the case of the embodiment of FIG. 6, the top ply 1 and the middle ply 3 have been embossed together. In contrast, in the case of the embodiment of FIG. 7, the bottom ply 2 and the middle ply 3 have been embossed together.

A grammage of the tissue paper products of FIGS. 6 and 7 in a range of 45 to 75 g/m², respectively.

In the following, a number of experimental results obtained on the basis of coreless rolls according to an embodiment of the present disclosure will be discussed.

Examples of Coreless Rolls Made of Two-Ply Tissue Product

Coreless rolls of a tissue paper product with two plies including two CWP plies were manufactured (using a manufacturing apparatus of the type shown in FIG. 2). An outer diameter of the coreless rolls was 130 mm. In particular, examples in accordance with the present disclosure were manufactured, and comparative examples were manufactured, wherein the plies were plied-bonded such that there is not a nested structure.

During a first set of trials, two CWP plies (household towel base sheets) having a grammage of 21.5 g and a geometrical mean tensile (GMT) strength of around 215 N/m were used for manufacturing coreless rolls in accordance with the present disclosure including household towels made of two plies.

During a second set of trials, two CWP plies (household towel base sheets) having a grammage of 24.7 g and a geometrical mean tensile (GMT) strength of around 258 N/m were used for manufacturing coreless rolls in accordance with the present disclosure including household towels made of two plies.

The rolls were made to have an outer diameter of 130 mm, with an inner core diameter of 40 mm. The sheet length and with were made to be 230 mm.

Comparative examples 1 and 2 were manufactured. Moreover, comparative examples 3 and 4 were manufactured without a nested structure.

The following table 1 summarizes the results of the first set of trials (examples 1-4), the second set of trials (examples 5 and 6), as well as comparative examples 1-4. The embossing load for the top ply was 27 kg. The embossing load for the bottom ply was 17 kg.

Table 1 indicates the values of the grammage (the units gsm stands for $g/m^2$), the density of the roll, the caliper ratio of the manufactured coreless roll, the sheet count, the thickness, the geometrical mean tensile strength ("GMT"), and the radial compression strength.

TABLE 1

| Example | Grammage (gsm) | Roll density (kg/m3) | Caliper ratio | Thickness (mm) | Sheet Count | GMT | Radial compression strength (N) |
|---|---|---|---|---|---|---|---|
| 1 | 42.5 | 69 | 20% | 0.74 | 85 | 234 | 21 |
| 2 | 42.3 | 89 | 41% | 0.67 | 110 | 219 | 31 |
| 3 | 41.8 | 120 | 61% | 0.56 | 150 | 212 | 37 |
| 4 | 42 | 88 | 47% | 0.7 | 110 | 200 | 39 |
| 5 | 47.7 | 68 | 21% | 0.84 | 75 | 339 | 32 |
| 6 | 47.4 | 91 | 40% | 0.73 | 100 | 345 | 50 |
| Comp. 1 | 35.7 | 70 | 8% | 0.58 | 100 | 103 | 21 |
| Comp. 2 | 35.9 | 90 | 40% | 0.56 | 125 | 106 | 29 |
| Comp. 3 | 42.2 | 69 | 10% | 0.73 | 85 | 254 | 10 |
| Comp. 4 | 42.2 | 89 | 20% | 0.66 | 100 | 245 | 20 |

As can be seen from table 1, the embodiments of coreless in accord the present disclosure have high geometrical mean tensile strengths, combined with high caliper ratios. The nested structure may promote this and allow avoiding the need for mandatory use of hybrid structures (need of at least one expensive structured ply) or heated embossing or specific embossing design to make a good coreless roll with acceptable properties for the consumer.

Due to the high caliper strength, the coreless rolls described above are robust, for example, in terms of their handling and storage properties. Thus, they may achieve high customer satisfaction.

Examples of Coreless Rolls Made of Three-Ply Tissue Product

During a further set of trials, embodiments of three ply household towel coreless rolls in accordance with the present disclosure, as well as comparative products (with a non-nested structure) were manufactured. The embodiments 1-3 were manufactured using three CWP conventional base sheets with a grammage of 18 gsm and a GMT around 223 N/m. Household towel coreless rolls were produced with an outer diameter of 130 mm and an inner core diameter of 40 mm. The sheet lengths and widths were 230 mm.

Comparative example 1 was manufactured using three CWP conventional base sheets with a grammage of 18 gsm and a GMT around 223 N/m. Moreover, comparative example 2 was manufactured without a nested structure.

The embossing load for the top ply was 27 kg. The embossing load for the bottom ply was 25 kg.

Table 2 summarizes the results of these further trials.

TABLE 2

| Example | Grammage (gsm) | Roll density (kg/m3) | Caliper ratio | Thickness (mm) | Sheet Count | GMT | Radial compression strength (N) |
|---|---|---|---|---|---|---|---|
| 1 | 52 | 100 | 28% | 0.89 | 75 | 411 | 49 |
| 2 | 52 | 80 | 37% | 0.79 | 90 | 425 | 55 |
| 3 | 52 | 100 | 55% | 0.7 | 115 | 406 | 72 |
| Comp. 1 | 54.1 | 100 | 24%% | 0.68 | 95 | 176 | 36 |
| Comp. 2 | 52 | 100 | 9%% | 0.63 | 90 | 616 | 17 |

As can be seen from table 2, the embodiments of coreless in accord the present disclosure have high geometrical mean tensile strengths, combined with high caliper ratios. The nested structure may promote this and allow avoiding the need for mandatory use of hybrid structures (need of at least one expensive structured ply) or heated embossing or specific embossing design to make a good coreless roll with acceptable properties for the consumer.

Due to the high caliper strength, the coreless rolls described above are robust, for example, in terms of their handling and storage properties. Thus, they may achieve high customer satisfaction.

It will be apparent to those skilled in the art that various modifications and variations can be made in the disclosed devices and systems without departing from the scope of the disclosure. Other aspects of the disclosure will be apparent to those skilled in the art from consideration of the specification and practice of the features disclosed herein. It is intended that the specification and examples be considered as exemplary only. Many additional variations and modifications are possible and are understood to fall within the framework of the disclosure.

The invention claimed is:

1. A coreless roll of a tissue paper product comprises:
a spirally wound continuous web of tissue paper product having a first end and a second end, the web of tissue paper product being wound to define an axially extending inner hole centrally positioned relative to the coreless roll such that the first end is located on the outer side of the coreless roll and the second end is located at the inner hole,
wherein the tissue paper product comprises two plies, being a first ply and a second ply, the first ply and the second ply being ply-bonded,
wherein a grammage of the tissue paper product is in a range of 35 to 55 g/m$^2$,
the tissue paper product has a Geometric Mean Tensile strength of at least 200 N/m, and wherein:
the first ply and the second ply are made of Conventional Wet Press (CWP) paper,
the first ply and the second ply have been embossed to be nested,
the coreless roll has an outer diameter in the range of 95 to 150 mm, a diameter of the inner hole is in the range of 20 to 50 mm, and a density of the coreless roll is in a range of 70 to 90 kg/m$^3$, and
a caliper ratio of the roll is in a range of 40% to 70%,
the caliper ratio $(c_s-c_t)/c_t$ being obtained by dividing a difference between a standard caliper $c_s$ of the tissue paper product as defined by the standard ISO-12625-3:2014 and a theoretical caliper $c_t$ of the tissue paper product by the theoretical caliper $c_t$, and
the theoretical caliper $c_t$ being defined as a ratio between a grammage of the tissue paper product and the density of the roll.

2. The coreless roll of a tissue paper product of claim 1, wherein the caliper of the tissue paper product is at least 0.7 mm.

3. The coreless roll of a tissue paper product of claim 1, wherein at least one of the two plies has been embossed with a heated embossing roll.

4. The coreless roll of a tissue paper product of claims 3, wherein the first embossments have been formed by a first heated embossing roll and, the third embossments have been formed by the first heated embossing roll,
and/or wherein the second embossments have been formed by a second heated embossing roll, and/or wherein the third embossments have been formed by a third heated embossing roll,
and/or wherein, the first ply has been moistened, prior to having been embossed, with an amount of liquid in the range of 2% to 12% of the basis weight of the first ply and wherein the liquid is provided with one or several additives, or wherein the first ply has not been moistened with a liquid prior to having been embossed.

5. The coreless roll of a tissue paper product of claim 1,
wherein the first ply comprises first embossments with a first height (h1), the first height being in a range of 0.2 mm to 2.0 mm,
wherein the adhesive includes lamination glue applied to tips of the first embossments of the first ply,
wherein the second ply comprises second embossments with a second height, the second height being in a range of 0.2 mm to 2.0 mm,
at least a part of the second embossments are nested in at least a part of the first embossments, and
wherein the first ply optionally comprises third embossments with a third height smaller than the first height.

6. The coreless roll of a tissue paper product of claim 1, wherein the coreless roll has a radial compression strength of 20 N or more.

7. The coreless roll of a tissue paper product of claim 1, wherein at least a part of an innermost circumvolution, optionally the entire innermost circumvolution, of the absorbent material of the coreless roll at the second end comprises a stabilizing coating composition.

8. The method of manufacturing a coreless roll of a tissue paper product according to claim 1, the method comprising the steps of:
embossing the first ply with a first embossing roll with first embossing protrusions to form first embossments with a first height in a range of 0.2 mm to 2.0 mm;
embossing the second ply with a second embossing roll with second embossing protrusions to form second embossments with a second height in a range of 0.2 mm to 2.0 mm; and
wherein, optionally, the first embossing roll also comprises third embossing protrusions and the step of embossing the first ply forms first and third embossments on the first ply,
or wherein the method optionally comprises a step of embossing the first ply with a third embossing roll with third embossing protrusions to form third embossments with a third height smaller than the first height.

9. A method of manufacturing a coreless roll of a tissue paper product, the tissue paper product being made of two plies, the method comprising the steps of:
providing a first ply of Conventional Wet Press paper (CWP) and a second ply of Conventional Wet Press paper (CWP);
embossing the two plies such that they are nested and ply-bonding the two plies to form a tissue paper product with a grammage in a range of 35 g/m$^2$ to 55 g/m$^2$, a Geometric Mean Tensile strength of at least 200 N/m, and a caliper ratio in a range of 40% to 70%;
spirally winding up the tissue paper product on a mandrel to form a coreless roll and to define an axially extending inner hole, with a first end of the tissue paper product being located on the outer side of the coreless roll and the second end being located at the inner hole; and
withdrawing the mandrel;

wherein the coreless roll comprises an outer diameter in the range of 95 to 150 mm and a diameter of the inner hole is in the range of 20 to 50 mm, and the density of the coreless roll lies in a range of 70 to 90 kg/m$^3$.

10. The method of manufacturing a coreless roll of a tissue paper product of claim 9, wherein a caliper of the formed tissue paper product is at least 0.7 mm.

11. The method of manufacturing a coreless roll of a tissue paper product of claim 9, comprising the step of heat-embossing at least one of the two plies.

12. The method of manufacturing a coreless roll of a tissue paper product of claim 9, wherein the method comprises the step of coating at least a part of an innermost circumvolution, optionally the entire innermost circumvolution, of the tissue paper product of the coreless roll at the second end with a stabilizing coating composition.

13. A coreless roll of a tissue paper product manufactured according to the method of claim 9.

* * * * *